(12) United States Patent
Stone et al.

(10) Patent No.: US 12,107,763 B2
(45) Date of Patent: Oct. 1, 2024

(54) VIRTUAL NETWORK INTERFACES FOR MANAGED LAYER-2 CONNECTIVITY AT COMPUTING SERVICE EXTENSION LOCATIONS

(71) Applicant: Amazon Technologies, Inc., Seattle, WA (US)

(72) Inventors: Eric Samuel Stone, Seattle, WA (US); Anthony Nicholas Liguori, Bainbridge Island, WA (US); Jonathan Mullen, Seattle, WA (US); Matthew Browne Barr, Arlington, VA (US); Steven Anthony Kady, Seattle, WA (US); Steven Douglas Robinson, Bellevue, WA (US); Tal Avraham, Seattle, WA (US); Tatiana Cooke, Seattle, WA (US); Clint Joseph Sbisa, Seattle, WA (US); Vitaly Ostrovsky, Rehovot (IL); Jonathan Chocron, Netanya (IL); Avigdor Segal, Netanya (IL); Abhishek Katuluru, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 410 days.

(21) Appl. No.: 17/537,232

(22) Filed: Nov. 29, 2021

(65) Prior Publication Data
US 2023/0171189 A1 Jun. 1, 2023

(51) Int. Cl.
*H04L 45/00* (2022.01)
*H04L 12/46* (2006.01)
(Continued)

(52) U.S. Cl.
CPC .......... *H04L 45/66* (2013.01); *H04L 12/4641* (2013.01); *H04L 45/745* (2013.01); *H04L 61/5007* (2022.05)

(58) Field of Classification Search
None
See application file for complete search history.

(56) References Cited

U.S. PATENT DOCUMENTS 8,868,710 B2 10/2014 Schultze et al.
10,833,949 B2 11/2020 Liguori et al.
(Continued)

OTHER PUBLICATIONS

U.S. Appl. No. 16/196,723, filed Nov. 20, 2018, Anthony Nicholas Liguori, et al.
(Continued)

*Primary Examiner* — Anh Ngoc M Nguyen
(74) *Attorney, Agent, or Firm* — Robert C. Kowert; Kowert, Hood, Munyon, Rankin & Goetzel, P.C.

(57) ABSTRACT

A networking manager of an extension server of a virtualized computing service detects that a data link layer frame has been obtained at the extension server. The networking manager delivers at least a portion of contents of the frame to a compute instance running at the extension server in response to determining that a destination media access control (MAC) address of the frame matches a MAC address of a local-premise-access virtual network interface attached to the compute instance. The local-premise-access virtual network interface is not assigned an Internet Protocol (IP) address from a range of IP addresses managed by the virtualized computing service.

20 Claims, 10 Drawing Sheets

(51) Int. Cl.
*H04L 45/745* (2022.01)
*H04L 61/5007* (2022.01)

(56) References Cited

U.S. PATENT DOCUMENTS

| | | |
|---|---|---|
| 11,064,017 B2 | 7/2021 | Liguori et al. |
| 11,323,485 B2 * | 5/2022 | Vishwanathan ...... H04L 63/205 |
| 2014/0126418 A1 | 5/2014 | Brendel |
| 2015/0365281 A1 | 12/2015 | Marino |
| 2016/0048402 A1 * | 2/2016 | Tsirkin ................ H04L 67/1023 |
| | | 718/1 |
| 2016/0261496 A1 * | 9/2016 | Chang ................. H04L 12/4633 |
| 2020/0159555 A1 | 5/2020 | Liguori |

OTHER PUBLICATIONS

U.S. Appl. No. 16/581,619, filed Sep. 24, 2019, Anthony Nicholas Liguori, et al.

International Search Report and Written Opinion mailed Mar. 7, 2023 in PCT/US2022/079858, Amazon Technologies, Inc., pp. 1-14.

* cited by examiner

VIRTUAL NETWORK INTERFACES FOR MANAGED LAYER-2 CONNECTIVITY AT COMPUTING SERVICE EXTENSION LOCATIONS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment. In some cases, virtualization management techniques and associated resource manageability benefits may be extended to premises other than data centers of a cloud provider.

Figure 1:
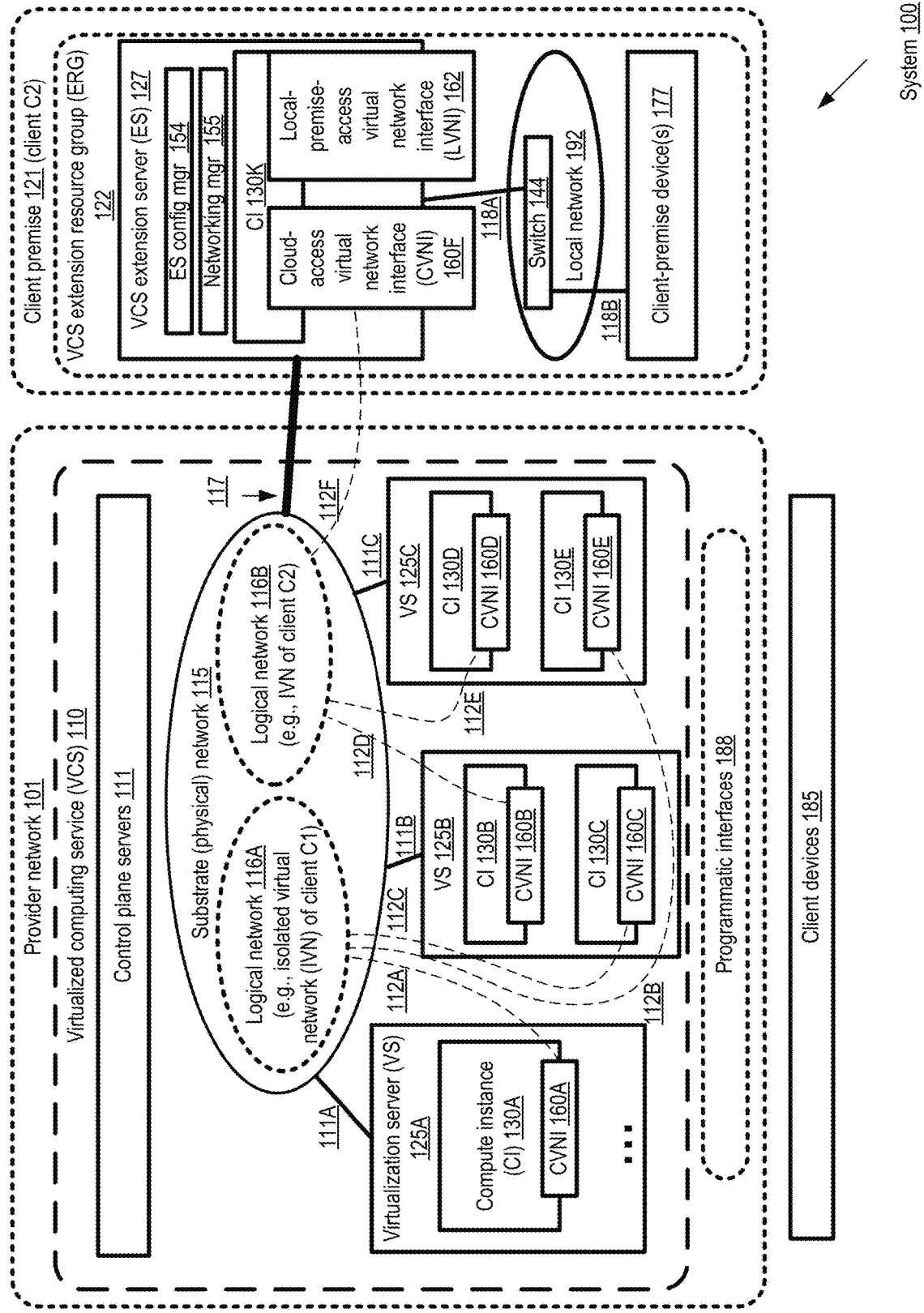
FIG. 1 illustrates an example system environment in which a local-premise-access virtual network interface used for managed Open Systems Interconnection model Layer 2 communications may be programmatically attached to a compute instance launched at extension server of a virtualized computing service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for enabling managed Open Systems Interconnection Model Layer 2 (OSI L2) communications between compute instances of a virtualized computing service (VCS) of a provider network or cloud computing environment, set up a premise external to the data centers of the provider network, and local devices at the external premise. Such an external premise can include a customer data center, a manufacturing facility, a restaurant or the like, at which the owner of the external premise wishes to execute applications within VCS compute instances at local servers, and also wishes to implement applications and protocols which require OSI L2 connectivity between non-VCS devices (devices that are not managed or owned by the VCS) located at the premise and the compute instances. The external premise is referred to as a VCS extension premise, as various types of features and functions supported by the VCS at the provider network's data centers are extended to the external premise. The local servers at which VCS compute instances are run at an external premise are referred to as VCS extension servers or "outpost" servers.

The compute instances can be set up using commands sent via secure network pathways established between control plane servers of the VCS (which are located at data centers of the provider network) and the extension servers. Several types of virtual network interfaces or VNIs (logical devices managed by the VCS and mapped to physical network interfaces by the VCS) can be used to enable network connectivity for VCS compute instances, including cloud-access VNIs (CVNIs) and local-premise access VNIs (LVNIs). VNIs (which can also be referred to as "elastic network interfaces" or ENIs) enable various networking-related attributes such as IP (Internet Protocol) addresses and/or security settings governing egress or ingress of messages to be transferred easily between compute instances without necessarily reconfiguring physical network cards. Such attribute transfers can be accomplished by detaching a VNI programmatically from one compute instance and attaching it programmatically to another compute instance, independent of the specific hardware network interface cards (NICs) of the host at which the compute instances run. When a VNI is created or modified, e.g., at the request of a VCS client or customer, metadata indicating the properties of the VNI (IP addresses, media access control (MAC) addresses, security rules, and the like) is stored or updated by administrative components of the VCS.

By programmatically attaching a cloud-access virtual network interface (CVNI) to a compute instance at an extension server, the compute instance can be configured with an IP (Internet Protocol) address within an isolated virtual network (IVN) established within the VCS on behalf of a client. As a result of the use of the CVNI, the compute instance running at the extension server is providing equivalent connectivity to other provider network resources (e.g., other compute instances implemented at virtualization servers within the provider network data centers, resources within other provider network services such as storage services, database services and the like) to the connectivity that would have been provided if the compute instance had been launched at a data center of the provider network. To provide OSI L2 connectivity managed using the VCS control plane, a second type of virtual network interface, referred to as a local-premise-access virtual network interface (LVNI) can also be programmatically attached to a compute instance at an extension server. A MAC address is assigned by the VCS control plane to an LVNI, and this address can be utilized for two-way OSI L2 communication (including broadcasts if desired) between the compute instance and devices within the on-premise network set up by the customer, without requiring intermediary networking devices such as routers or gateways. By using the combination of LVNIs and CVNIs, compute instances set up at VCS extension servers can thus access local on-premise resources (over OSI L2) as well as cloud-based resources (over IP) with equal ease, and the administrators of the on-premise resources do not have to go to the trouble of configuring or managing intermediary networking devices for the local traffic.

As one skilled in the art will appreciate in light of this disclosure, certain embodiments may be capable of achieving various advantages, including some or all of the following: (a) enabling programs running at VCS compute instances on extension servers to participate in applications and protocols running at OSI Layer 2 at extension premises, without requiring configuration of intermediary devices such as gateways or routers at the extension premises, while still retaining full connectivity to the provider network's data center resources, and (b) enhancing the user experience of administrators of local networks at extension premises, e.g., by enabling the configuration and management of both cloud-access virtual network interfaces and local-premise-access virtual network interfaces using a common set of tools.

According to some embodiments, a system may comprise one or more control plane servers (CPSs) of a virtualized computing service (VCS) of a provider network, and a networking manager running at an extension server (ES) of the VCS. The CPSs may be located within one or more data centers of the provider network, while the ES may be located at a premise external to the provider network's data centers, referred to as a VCS extension premise. A CPS may cause at least a pair of virtual network interfaces (VNIs) to be programmatically attached to a compute instance (e.g., a virtual machine) of the VCS which is running at the ES in various embodiments. The process of programmatic attachment may involve sending a command or request from the CPS to a local administrative component at the ES in at least some embodiments. One of the VNIs, referred to as a cloud-access VNI or CVNI, may be assigned an IP address from a range of IP address of an isolated virtual network (IVN) configured at the VCS on behalf of the VCS client at whose request the extension server is configured, and may be utilized primarily for communication with resources at the provider network's data centers, such as compute instances, storage servers of a storage service, database servers of a database service, and so on. An IVN (also referred to as a virtual private cloud) may comprise a collection of networked resources (including, for example, compute instances) allocated to a given VCS client, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. In at least some embodiments, the CVNI may be assigned an address from within a private IP address range selected by the client. In contrast to the CVNI, the second VNI programmatically attached to the compute instance, referred to as a local-premise-access VNI (LVNI) or simply as a local VNI, may not be assigned an IP address of the IVN. The CPS may assign a media access control (MAC) address to the LVNI, which can be used as a source or destination address for OSI data link layer (Layer 2) communications with non-VCS devices at the extension premise in various embodiments.

The networking manager of the extension server (which may for example be implemented as part of virtualization management software and/or at virtualization management offloading hardware cards of the extension server) may be responsible for determining how to respond to data link layer frames or messages received at the extension server in various embodiments. The extension server may be assigned an IP address from within a substrate or underlying physical network of the VCS in some embodiments, just as VCS virtualization servers within the provider network data centers are assigned substrate addresses. In response to determining that a data link layer frame received at the extension server comprises a first IP packet with a substrate address as the destination address, the networking manager may utilize an encapsulation protocol of the VCS to extract a second IP packet from the first IP packet. If the destination address of the extracted IP packet matches the IP address assigned to a CVNI of a compute instance launched at the extension server (note that there may be several such compute instances, and more than one of them may have a CVNI attached), the extracted IP packet may be delivered to that compute instance by the networking manager in various embodiments.

In contrast, if the received data link layer frame does not contain an IP packet with a substrate destination address, the networking manager may attempt to determine whether the destination MAC address of the received frame matches the MAC address assigned to an LVNI of any of the compute instances running at the extension server, and the encapsulation protocol may not be used. If an LVNI with a matching MAC address is found, the networking manager may deliver at least a portion of the contents of the received frame to the compute instance to which that LVNI is attached in various embodiments. It may sometimes be the case that the received frame is a broadcast frame (which has a special destination MAC address), in which case in at least some embodiments the networking manager may deliver contents of the received frame to each of zero or more compute instances that (a) are running at the extension server (b) have LVNIs attached and (c) are configured to accept L2 broadcast frames (note that configuration settings may be used in some embodiments to prevent delivery of broadcast frames to one or more compute instances or their attached LVNIs).

In some embodiments, an LVNI may be attached to a compute instance at an extension server as part of the workflow performed in response to a launch request for the compute instance. In other embodiments, separate programmatic requests may be submitted by a VCS client to create LVNIs (e.g., in advance of the launch of the compute instances to which they are eventually programmatically attached) and/or to programmatically attach LVNIs to specified compute instances. Similarly, in some embodiments, a CVNI may be automatically attached to a compute instance as part of the launch workflow, while programmatic requests may also be submitted to create CVNIs and/or attach them in at least some embodiments.

In at least one embodiment, the VCS may maintain a pool of MAC addresses, from which individual MAC addresses are assigned to LVNIs, and to which the MAC addresses of LVNIs which are being decommissioned are returned for re-use. In some embodiments, by default, an LVNI may be deleted or decommissioned when the compute instance to which it was attached terminates execution, and an indication that the LVNI's MAC address is available for re-use may be stored at the VCS control plane when a request to terminate the compute instance is received (or if the compute instance is terminated for other reasons, such as an error or failure). Such a MAC address may later be re-assigned to another LVNI by the VCS control plane, e.g., prior to programmatic attachment of that LVNI to another compute instance. In one embodiment, a VCS client may request that a MAC address which satisfies a specified property (e.g., matches a specified sub-string indicated by the client) be used for an LVNI which is to be attached to a compute instance of the client. If the VCS is able to identify a MAC address that satisfies the client's request from among the set of MAC addresses that the VCS is authorized to use, that MAC address may be used; thus, a VCS client may be able to influence the MAC addresses utilized for the client's LVNIs in at least some cases.

According to at least some embodiments, the VCS may collect respective sets of metrics for each VNI attached to a given compute instance, and provide LVNI and CVNI metrics separately (if desired) via programmatic interfaces to clients on whose behalf the VNIs are being used. Such metrics may include for example, the total number of messages received/sent using the respective VNIs, the total number of bytes received/sent, a distribution of the inbound/outbound traffic among different IP and/or MAC addresses, and so on in different embodiments. Clients may use programmatic requests to obtain the MAC addresses assigned to their LVNIs in at least some embodiments.

In various embodiments the data link layer traffic associated with an LVNI may be transmitted via a physical cable (e.g., an Ethernet cable) linking the extension server to an on-premise network switch (part of the physical network set up at the extension premise, managed by the client and not by the VCS). Other devices configured at the on-premise network, which can communicate with the compute instance to which an LVNI is attached using OSI L2 frames, may for example include Internet-of-things (IoT) devices, industrial automation devices (e.g., components implementing a pipeline of automated tasks at a manufacturing facility), servers owned/managed by the VCS client on whose behalf an extension server is configured, and so on in different embodiments. The VCS client may specify security settings (e.g., restrictions on sources from which frames can be received, or destinations to which frames can be sent, which may be expressed using VLAN (virtual local area network) identifiers or tags to enable VLAN-based segmentation of local premise OSI Layer 2 traffic) for traffic associated with LVNIs in various embodiments, and the networking manager may apply such security settings when determining the disposition of data link layer frames received at the extension server or sent from the extension server.

An LVNI (and/or a CVNI) may be programmatically detached from a compute instance and re-attached to a different compute instance, while retaining their properties such as MAC addresses and/or IP addresses in various embodiments. The compute instance CI2 to which an LVNI is attached after detachment from its earlier-attached compute instance CI1 may run at the same extension server or at a different extension server. In at least some embodiments, CI2 may be configured (e.g., via its CVNI) as part of a different IVN than CI1. Multiple LVNIs (and/or CVNIs) may be attached to a given compute instance in some embodiments. Multiple LVNIs may be attached to a given compute instance, for example, to facilitate the segmentation of local premise OSI layer 2 traffic by the network manager of the extension server at which that compute instance runs—e.g., messages associated with different VLAN identifiers/tags may be handled using respective LVNIs. After an LVNI with a given MAC address is detached from a compute instance, the networking manager may no longer deliver frames with that MAC address indicated as the destination to that compute instance in various embodiments. The OSI L2 messages sent/received using an LVNI's MAC address may include, among others, messages of the Address Resolution Protocol (ARP), the Domain Host Configuration Protocol (DHCP), or a custom data link layer application implemented within a local network at the extension premise in some embodiments.

In at least some embodiments a VCS may be implemented as one of a suite of services of a provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include, in addition to a virtualized compute service (VCS), data processing service(s) (e.g., map reduce, data flow, and/or other large scale data processing techniques), data storage services (e.g., object storage services, block-based storage services, or data warehouse storage services), network function virtualization services or packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, or a cloud compute service). This service may offer compute instances (also referred to as guest virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched (e.g., with attached LVNIs) at extension premises in response to programmatic requests from a client.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which a local-premise-access virtual network interface used for managed Open Systems Interconnection model Layer 2 communications may be programmatically attached to a compute instance launched at extension server of a virtualized computing service, according to at least some embodiments. As shown, system 100 includes resources and artifacts of a virtualized computing service (VCS) 110 of a provider network 101. The VCS 110 may implement one or more programmatic interfaces 188 which can be used by clients to submit programmatic requests from client devices 185 (such as laptops, desktops, mobile computing devices etc.), including for example requests to launch, terminate, or reconfigure compute instances 130. Programmatic interfaces 188 may, for example, include one or more web-based consoles, command-line tools, graphical user interfaces, APIs, and the like. The requests submitted by VCS clients may be directed to a set of control plane servers 111 of the VCS, which may in turn cause corresponding internal requests or commands to be implemented at various other components of the VCS.

In the embodiment depicted in FIG. 1, a variety of hardware servers may be used to set up compute instances 130 on behalf of VCS clients. The operator of the VCS 110 may, for example, set up racks containing standardized servers of various categories at one or more data centers of provider network 101, including virtualization servers (VSs) 125A, 125B and 125C. Compute instances (CIs) of various categories, such as CIs 130A, 130B, 130C, 130D, 130E, or 130C may be launched at the data centers' servers in response to client requests submitted to the control plane. Just as underlying virtualization servers may differ in capabilities from one another, the compute instances launched at the servers of the different sets may also differ in capabilities—e.g., CI 130A may be optimized for compute-intensive applications, while CIs 130B and 130C may be optimized for storage-intensive tasks.

In addition to enabling clients to acquire and use compute instances at provider network data centers, the VCS 110 may also permit clients to request compute instances at premises external to the provider network in various embodiments. For example, a logical extension of the VCS may be set up at client premise 121 in the depicted embodiment in response to a request from the client (C2) that owns/manages the premise 121. The client premise may therefore be referred to as a VCS extension premise in some embodiments. A group of VCS managed resources, referred to as a VCS extension resource group (ERG) 122 may be configured at the client premise 121. The ERG 122 may include one or more VCS extension servers (ESs) such as ES 127 in the depicted embodiment. A given ES may comprise zero or more compute instances (such as CI 130K) in the depicted embodiment, as well as various administrative components such as a networking manager 155 and an ES configuration manager 154 which receives and coordinates responses to commands from the VCS control plane.

Just as compute instances may be launched at VSs 125 in response to client requests received at the VCS control plane, a compute instance may be launched at a VCS extension server via secure communication channels established between the control plane and the extension server in the depicted embodiment. Furthermore, the VCS control plane servers may cause zero or more virtual network interfaces (VNIs) to be attached to a compute instance such as CI 130K. A VNI may be represented as a set of metadata entries stored at the VCS control plane in various embodiments, indicating a set of networking-related properties (e.g., IP addresses, MAC addresses, security rules for inbound/outbound traffic, etc.) that can be associated/disassociated with compute instance without having to modify settings of the physical networking devices (such as network interface cards or NICs) of the servers at which the compute instances are run.

The VCS 110 may comprise a physical network 115, also referred to as a substrate network, to which virtualization servers may be connected in the depicted embodiment. Links 111A, 111B and 111C indicate physical connections between the VSs and the substrate network 115. A tunneling-based technique may be used to associate a substrate network address with an extension server such as ES 127 in the depicted embodiment; this association is represented by line 117. As such, the VCS extension server may in effect be integrated into the substrate network 115.

Using the substrate network 115 as the physical infrastructure, a set of logical networks may be configured in the embodiment shown in FIG. 1, such as logical networks 116A or 116B. Examples of logical networks may include isolated virtual networks (IVNs) established on behalf of VCS clients in at least some embodiments—for example logical network 116A may comprise an IVN of client C1, while logical network 116B may comprise an IVN of client C2 in the scenario depicted in FIG. 1. A compute instance 130 may be provided a network address within a logical network by the VCS control plane servers by programmatically attaching a cloud-access VNI (CVNI) to which that network address is assigned in the depicted embodiment. Thus, for example, CI 130A of VS 125A may be configured within logical network 116A via CVNI 160A, as indicated by element 112A. CI 130B of VS 125B may be configured within logical network 116B using CVNI 160B, as indicated by line 112D. CI 130C of VS 125B may be configured within logical network 116A using CVNI 160C, as indicated by line 112C. CI 130D of VS 125C may be configured within logical network 116B using CVNI 160D, as indicated by line 112E. CI 130E may be configured within logical network 116A using CVNI 160E, as indicated by line 112B. In addition, a VCS control plane server may also configure CI 130K running at the extension server 127 as part of logical network 116B using CVNI 160F (to which an IP address within logical network 116B is assigned), as indicated by line 112F in the scenario shown in FIG. 1. To manage and route the network traffic directed to or from entities (such as compute instances 130) of the logical networks using the underlying substrate network to which the virtualization servers and extension servers are connected, a mapping service and/or an encapsulation protocol may be employed at the VCS 110, as discussed in further detail below with respect to FIG. 2.

The client premise 121 may comprise a local network 192 with a switch 144 or a similar networking intermediary device in the depicted embodiment. Various types of client-owned or client managed devices, such as IoT devices including sensors or smart appliances, servers running client-managed applications, industrial automation devices and the like may be configured as part of the client premise local network 192. Some such client-premise devices 177 may be physically linked via a cable such as 118B to switch 144.

In at least some embodiments, the client C2 at whose request an extension server 127 is configured by the VCS may wish to establish communications at OSI layer 2 between some number of client-premise devices 177 and a CI 130K of the extension server. In order to facilitate the management of such communications, a local-premise-access virtual network interface (LVNI)162 may be caused to be programmatically attached to CI 130K by the VCS control plane in the depicted embodiment. A MAC address may be assigned to the LVNI 162 by a VCS control plane server, while an IP address within the logical network 116B may not be assigned to the LVNI. The MAC address may be used by the networking manager 155 for directing inbound traffic received from the local network 192 via a physical cable 118A in the depicted embodiment to the CI 130K. The logical network address assigned to CVNI 160F may be used, in contrast, for communication with resources within the provider network data centers in at least some embodiments. Note that the ERG 122 may comprise one or more other compute instances (not shown in FIG. 1), running either at ES 127 or at another ES server. Network communications between such extension-premise compute instances may be transmitted using OSI Layer 2 in some cases (e.g., utilizing hardware loopback interfaces of the networking cards attached to the ES) or using IP and other higher-level protocols, depending on factors such as the application for which the communication is generated, whether the source and destination compute instances are running on the same ES and so on. In some cases, the encapsulation protocol of the VCS may be employed for IP packets sent between at least some pairs of compute instances at an ERG.

When a data link layer frame is received at the ES 127, the networking manager 155 may be responsible for its disposition in the depicted embodiment. The networking manager may examine the contents of the frame to determine whether the frame contains an IP packet with the substrate address of the ES 127 as its destination address. If the frame contains such an IP packet, the networking manager may use the encapsulation protocol of the VCS to extract a second IP packet from the first IP packet. If the destination address of the extracted IP packet matches the logical network address (CVNI address) of any CI running at the ES (such as CI 130K), the extracted IP packet may be delivered to that CI by the networking manager (otherwise, the extracted IP packet may be discarded in at least some embodiments). If the frame did not contain an IP packet with a substrate destination IP address, the networking manager may examine the destination MAC address of the frame, and deliver it to a CI such as 130K whose attached LVNI has the same MAC address in the depicted embodiment. Broadcast data frames (whose destination MAC address is a special address which does not match the MAC address of an LVNI) may be delivered to one or more CIs at the ES by the networking manager in the depicted embodiment. Frames that are not broadcast frames, do not have matching MAC addresses, and do not contain IP packets with substrate destination IP addresses may be dropped in the depicted embodiment.

Figure 2:
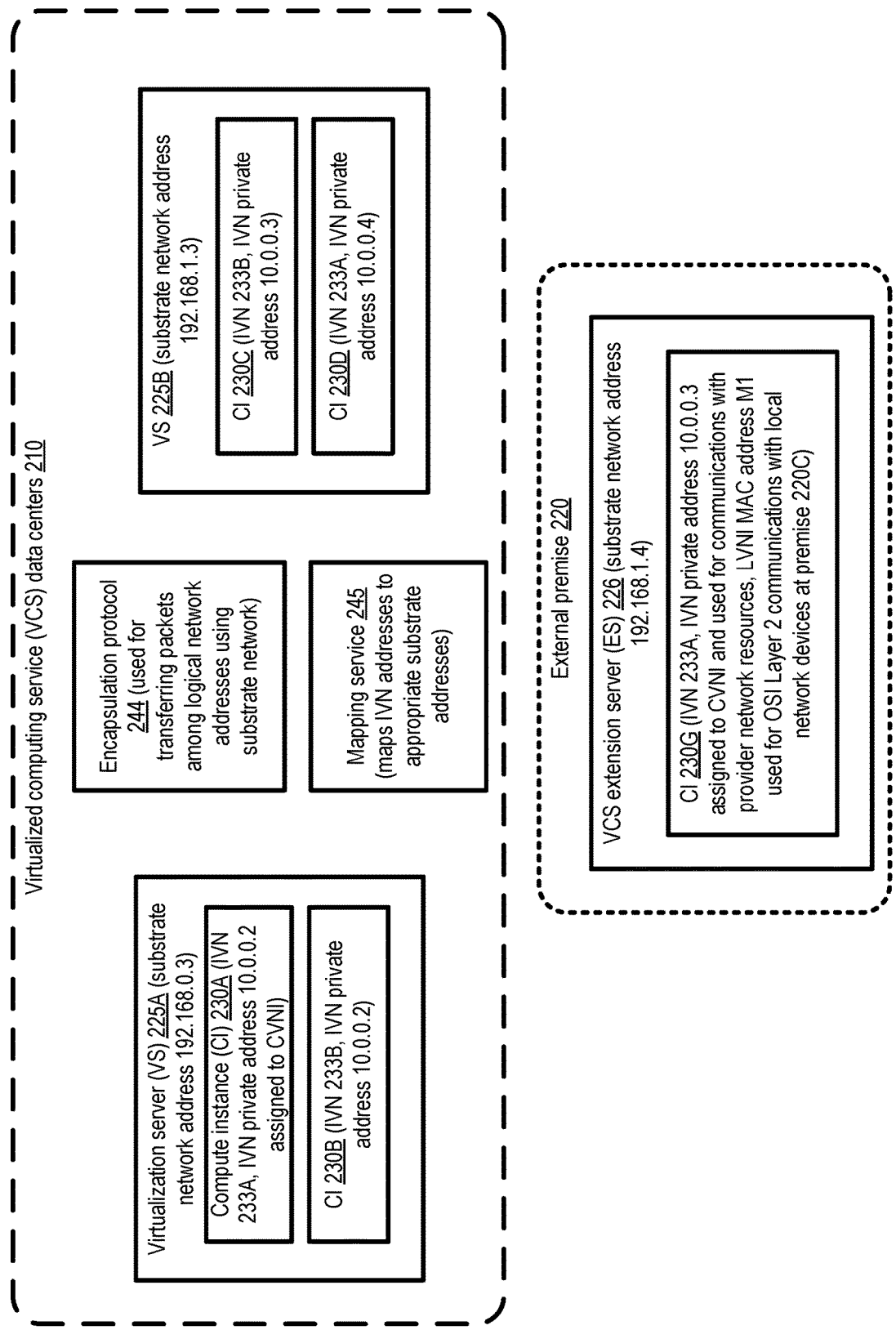
FIG. 2 illustrates an example of the use of a mapping service and an encapsulation protocol at a virtualized computing service at which logical networks are configured over a substrate network, according to at least some embodiments.

FIG. 2 illustrates an example of the use of a mapping service and an encapsulation protocol at a virtualized computing service at which logical networks are configured over a substrate network, according to at least some embodiments. The depicted scenario is presented to illustrate the kinds of networking-related operations that may have to be performed to enable traffic flows between compute instances set up within such logical networks (either at data centers of the VCS, or at external premises). IP (Internet Protocol) version 4 addresses are used by way of example in FIG. 1, although addresses formatted in accordance with other protocols such as IPv6 may be used in at least some embodiments. Note that the specific IP addresses shown in FIG. 2 are chosen as examples, and the techniques described herein are not limited to any specific addresses or address ranges.

In the depicted embodiment, two virtualization servers (VSs) at VCS data centers 210 and an extension server (ES) are shown. VSs 225A and 225B may each be connected physically to the substrate network of the VCS, e.g., via one or more Ethernet or similar cables linked to a top-of-rack switch configured within the substrate network. ES 226 may be connected to the VCS data centers via at least some network links that are not managed/owned by the provider network (e.g., links of the public Internet, and/or private links owned by other network services providers), but may nevertheless be assigned a network address of the substrate network using a technique discussed in more detail below. Substrate address 192.168.0.3 is assigned to VS 225A, substrate address 192.168.1.3 is assigned to VS 225C, and substrate address 192.168.1.4 is assigned to ES 226.

Compute instances launched at the virtualization servers may be assigned network addresses within isolated virtual networks in the depicted embodiment. For example, CIs 230A (at VS 225A), 230D (at VS 225B), and 230G (at ES 226) may all be configured within the same IVN 233A, and assigned respective IVN private addresses 10.0.0.2, 10.0.0.4, and 10.0.0.3 respectively. Similarly, CIs 230B and 230C may be assigned IVN private addresses 10.0.0.2 and 10.0.0.3 within IVN 233B. Note that as indicated earlier, address ranges used within IVNs for private addresses assigned to the CIs may overlap with one another—thus, CIs 230A and 230B have the same private address 10.0.0.2 within distinct IVNs (233A and 233B). The within-IVN addresses may be deemed to be private in that they are not advertised or made accessible outside the IVNs, at least by default, in some embodiments. In at least some embodiments, as discussed above, the private addresses may be assigned to respective cloud-access virtual network interfaces (CVNIs), and the CVNIs may be programmatically attached to or associated with the compute instances. In at least some embodiments, in contrast, at least some of the substrate addresses may be assigned to physical network interface cards or NICs (or to NIC emulators), e.g., at the virtualization servers.

In order to transmit network packets that originate at one CI to another CI, three types of network information may have to be considered in the depicted embodiment: the IVN private addresses of the source and destination, the IVNs to which the sources and destinations belong, and the substrate addresses of the underlying virtualization servers. For example, a packet originating at CI 230A and destined for CI 230G may indicate its source (private) address as 10.0.0.2 and its destination address as 10.0.0.3. However, the packet may actually have to be transferred from substrate network address 192.168.0.3 to substrate network address 192.168.1.4 to reach its intended destination. An encapsulation protocol 244 (which is used to envelop or encapsulate packets associated with logical network sources/destinations within larger "augmented" packets associated with substrate network sources/destinations) and an associated mapping service 245 of the VCS may be used to accomplish this type of transfer in the depicted embodiment. Networking virtualization management components of the VCS (including the networking managers running at extension servers, as well as networking managers running in the virtualization management hardware/software stacks of the VSs 225) may implement the encapsulation and de-capsulation operations of the protocol, and utilize the mapping service 245 to determine the specific substrate address to which the packets included in such transfers should be sent.

In the above example where a packet is being sent from CI 230A to CI 230G, the mapping service 245 may indicate to a networking manager associated with VS 225A that for IVN 233A, the destination private address 10.0.0.3 corresponds to the substrate address 192.168.1.4. The networking manager associated with VS 225A may generate an encapsulation packet which includes the original packet within it, has a substrate source address of 192.168.0.3, a substrate destination address of 192.168.1.4, and identifies the IVN 233A as the IVN within which the packet is being transferred. At the receiving end at external premise 220, a networking manager running at the ES 226 may extract (de-capsulate) the original packet from the encapsulation packet, and provide it to the destination CI 230G. In some embodiments, to ensure that the packet is from a trusted/valid source, the networking manager may consult the mapping service to perform a reverse mapping (e.g., to identify the origin of the packet) before extracting the original packet. The mapping service 245 may thus provide security by preventing the opening of packets that are not validated. For packets being transmitted in the reverse direction, the networking manager may consult the mapping service to obtain the right substrate address for the destination, and perform the required encapsulation operation in at least some embodiments.

Figure 3:
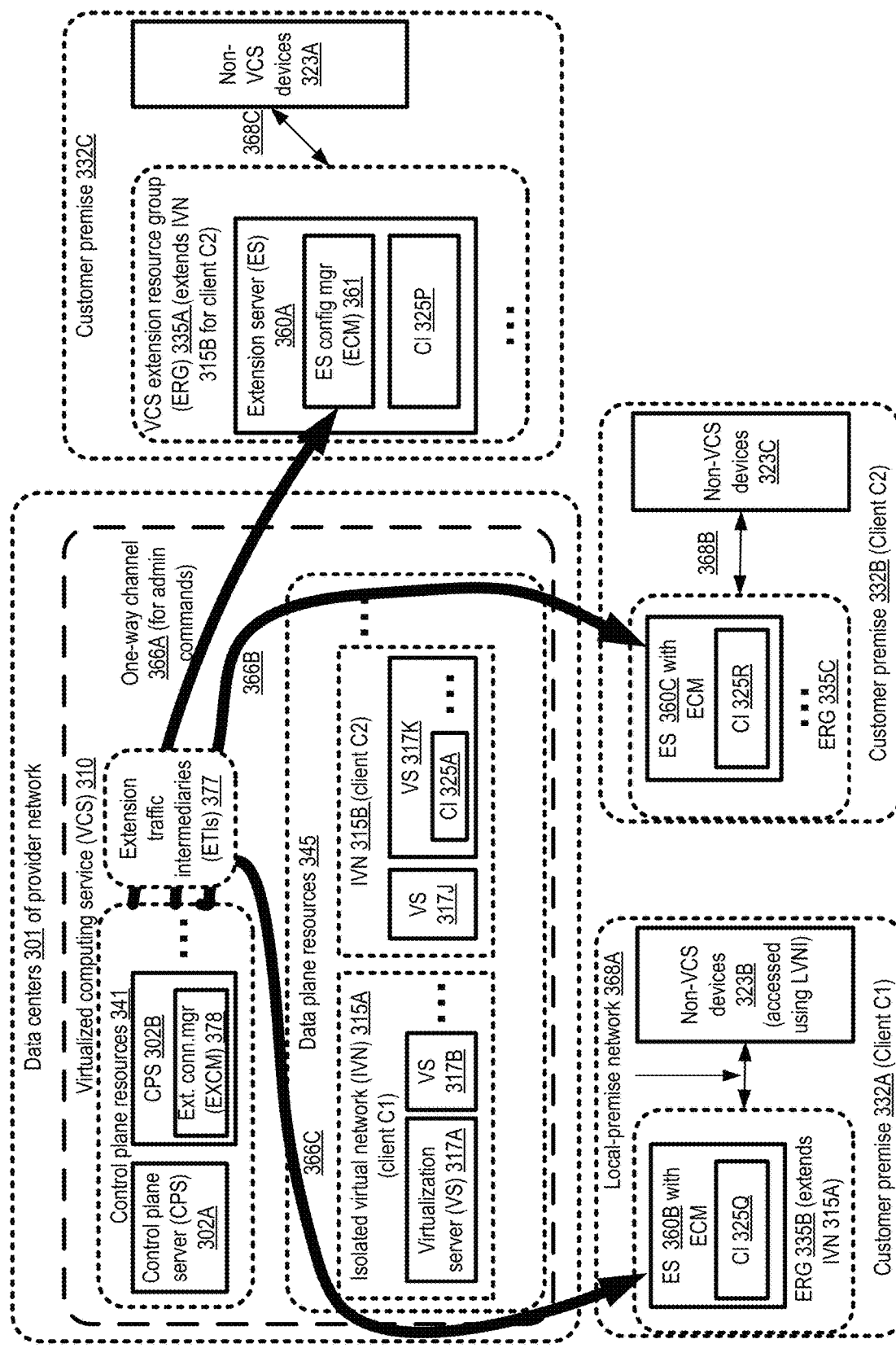
FIG. 3 illustrates an example use of extension traffic intermediary devices to enable control plane traffic to flow securely from data centers of a provider network to external premises at which compute instances managed by a virtualized computing service are launched, according to at least some embodiments.

FIG. 3 illustrates an example use of extension traffic intermediary devices to enable control plane traffic to flow securely from data centers of a provider network to external premises at which compute instances managed by a virtualized computing service are launched, according to at least some embodiments. Data plane resources 345 of a VCS 310, which are located at data centers 301 of a provider network may be organized into a set of isolated virtual networks (IVNs) similar to those discussed earlier. For example, IVN 315A may be set up on behalf of a client C1, IVN 315B may be established on behalf of client C2, and so on, with the clients being provided flexibility with respect to networking configuration settings within their respective IVNs. IVN 315A may include compute instances run at virtualization servers 317A and 317B, while IVN 315B may include compute instances (CIs) launched at virtualization servers 317J and 317K (such as CI 325A). The VCS control plane resources 341 may include a set of control plane servers (CPSs) 302, such as 302A and 302B in the depicted embodiment, responsible for administrative tasks such as receiving and responding to requests to set up VCS extension resource groups (ERGs), instance configuration requests at data center virtualization servers or extension servers 360, provisioning additional virtualization servers, monitoring the health of data plane resources, and so on.

In the embodiment depicted in FIG. 3, respective extension servers 360 may be set up as part of extension resource groups that extend VCS data plane functionality at several premises other than data centers 301. For example, extension server (ES) 360A is set up as part of an ERG 335A at customer premise 332C of a client C2, ES 360B is set up as part of ERG 335B at customer premise 332A on behalf of a client C1, and ES 360C is set up at ERG 335C of a second customer premise 332B of client C2. The ESs may each comprise respective configuration managers (ECMs) (such as ECM 361 at ES 360A), responsible for receiving administrative commands from the control plane resources 341 and executing them at the ESs. In addition to the ESs 360, at least some of the external premises 332A, 332B and 332C may also include non-VCS devices (e.g., servers that are not utilized to host VCS compute instances)—for example, premise 332A may include non-VCS devices 323B, premise 332B may include non-VCS devices 323C, and premise 332C may include non-VCS devices 323A in the depicted embodiment. The non-VCS devices may communicate with the compute instances launched at the ESs (such as CIs 325P, 325Q or 325R) using local-premise-access VNIs (LV-NIs) and OSI layer 2 messages sent over links of local-premise networks 368A, 368B or 368C. The extension servers may thus be configured within multiple networks, including the local on-premise networks and one or more VCS networks (e.g., using addresses assigned to the extension servers from a range used for the VCS substrate network). Note that the ESs 360 may differ from one another in various capabilities, depending on the needs of the client on whose behalf they are configured by the VCS control plane—e.g., ES 360A may have different or more CPUs than ES 360B, ES 360C may have greater memory or a different CPU architecture than ES 360A, and so on. Note also that while only a single ES is shown at each of the external premises in FIG. 3, multiple such ESs may be located and used to host VCS compute instances within a single external premise in at least some embodiments.

From the perspective of a client of the VCS, in various embodiments an ERG may represent a local extension of the capabilities of the VCS, that can be set up at any desired physical location that has access to the Internet and can accommodate extension servers acceptable to the VCS and the client. From the perspective of the VCS itself, an ERG may be considered to be virtually located in the same provider network data centers as the core VCS infrastructure, while being physically located in a customer-selected premise. In various embodiments, when an ERG is set up at a customer-selected location, the resources of the ERG may be managed by control plane components of the VCS that are located in the data centers of the provider network. As such, in at least some embodiments, setting up and using an ERG at a given premise may not require control plane capabilities of the VCS to be duplicated locally; instead, secure network connections may be set up for control-plane commands to be transmitted from the data centers of the provider network to PVMDs at the ERG, and the resources of the ERG may be devoted primarily to data plane operations.

In some embodiments, one or more of the compute instances (CIs) launched at an ES of an ERG may be configured within an IVN 315 (e.g., the CIs may be programmatically attached to cloud-access virtual network interfaces (CVNIs) with addresses within the range of addresses of the IVN, the CIs may be included in a database of compute instances of the IVN, information about the membership of the CIs in the IVN may be provided to a mapping service of the VCS, etc.). In some cases, a CI running at an ERG may be included in an IVN which also includes CIs within the provider network data center, and such an ERG may be said to extend the IVN. For example, ERG 335A extends IVN 315B of client C2 in FIG. 3, while ERG 335B extends IVN 315A configured for client C1. Some ERGs may include CIs configured within an IVN that does not include any compute instances within the VCS data centers, or may not even be configured within IVNs.

Because the external premises 332 do not have direct access to the VCS substrate network, additional work may be required from the VCS to configure compute instances at the external premises than is required for compute instances at the data centers 301. In the embodiment depicted in FIG. 3, an ES configuration manager (ECM) 361 may perform several functions. For example, the ECM may establish connectivity with one or more extension traffic intermediaries (ETIs) 377 of the VCS via one or more secure channels (such as Virtual Private Network (VPN) tunnels) 366 (e.g., channels 366A, 366B or 366C). The secure channels 366 may be required because the traffic between the ECM and the VCS control plane (as well as data plane) has to flow over physical network paths that are not controlled or managed by the VCS, and such physical network paths may thus not be trusted from the perspective of the VCS. The ETIs 377 may be implemented (e.g., using one or more compute instances and/or IVNs set up on behalf of the VCS control plane) at computing devices within the data centers 301 of the provider network, and the ETIs may be configured to perform one or more security operations with respect to traffic between the external premise and the data centers of the provider network. Control-plane commands may only be permitted to flow in one direction using the secure channels established with the ETIs in the depicted embodiment: from the data centers of the provider network to the external premise. In contrast, data plane traffic may flow in either direction between the external premise and the provider network in various embodiments. Additional details regarding the manner in which control plane and data plane traffic flows between the provider network data centers and the external premises in various embodiments are provided below.

An ECM of an ES 360 may also assign a network address of the VCS substrate network (i.e., a network address selected from a range of addresses assigned to virtualization servers within the VCS substrate network) to the ES in at least some embodiments. The substrate address assigned to the ES may also be assigned to one of the ETIs 377 in at least some embodiments, enabling the ETI to serve as a proxy or representative of the ES within the provider network data centers.

In addition, the ECM may act as an intermediary for configuration commands pertaining to the CIs launched at an ES 360 within an ERG 335 in at least some embodiments. For example, a client of the VCS may submit a request for a configuration operation of a CI at an ERG to the VCS control plane (using pathways other than the secure channels set up with the ETIs), and an indication of the request may be provided to the ECM at that ERG from the ETIs. In response to the indication, one or more configuration operations of the compute instance may be performed at the CSS. In at least some embodiments, an ECM may be instantiated in response to the detection of one or more triggering conditions (such as the detection of power and/or Internet connectivity) at the ES. The ECM may then initiate the automated establishment of (or at least participate in the automated establishment of) secure network connectivity with one or more VCS components (e.g., the ETIs 377) at one or more provider network data centers automatically, e.g., without requiring additional configuration guidance from a VCS client on whose behalf the ES is configured. After connectivity has been established, in various embodiments the client may issue commands to instantiate compute instances (and/or perform other operations associated with compute instances, such as attaching LVNIs) at the ES, in a manner analogous to the way in which such commands would be issued with respect to compute instances that use only provider network resources. From the perspective of the VCS client, the functionality of the VCS may now seamlessly be utilized using local resources (as well as resources located in the provider network data centers, if desired). The compute instances set up at the ERG may communicate with non-VCS devices 323 in various embodiments, as well as with other CIs that are set up in the provider network data centers or at external premises, as desired. At least some CIs that are set up at the ERG, and associated higher-level services that use such CIs as building blocks, may continue to function even during periods of time when connectivity to the provider network data centers is temporarily disrupted in some embodiments. Especially for VCS customers that wish to access and process large amounts of application data that is stored at customer data centers (e.g., for legal compliance, security or other reasons) with low latencies, the ability to set up VCS CIs co-located with the application data may be highly beneficial in various embodiments.

At the data centers 301 of a provider network at which the VCS 310 is implemented, control plane resources 341 may include one or more extension connectivity managers (EX-CMs) 378 (implemented using some combination of hardware and software at one or more servers of the VCS) in the depicted embodiment. The EXCM may determine that connectivity via secure channels is to be established with an ECM such as ECM 361, e.g., in response to a programmatic request received at the control plane. In some embodiments, the ECM may send a request for secure connectivity to the VCS control plane (e.g., via pathways of the public Internet) when the ECM is brought online and connected to the Internet via a local-premise network at the external premise. In order to enable the secure connectivity, a set of extension traffic intermediaries (ETIs) 377 be set up by an EXCM. ETIs 377 may include, for example, an extension server proxy (ESP) and a tunnel endpoint (referred to as a provider-network-side tunnel endpoint) in various embodiments. In some embodiments, the ESP and the tunnel endpoint may comprise respective compute instances of the VCS. In at least one embodiment, the ESP may be set up within one IVN established on behalf of the VCS control plane (distinct from the IVNs set up on behalf of VCS clients), while the tunnel endpoint may be set up within another IVN established for the VCS control plane.

A virtual network interface (VNI) may be programmatically attached to the ESP by the EXCM in some embodiments. In at least some embodiments, the VNI attached to the ESP may be assigned the identical substrate network address which is assigned to the ES 360 for which the ESP is configured. In at least some embodiments, the ECM may receive an indication of the substrate network address from the EXCM, and assign that address to the ES 360. The ECM may serve as the external endpoint of a secure (e.g., encrypted) network tunnel established with the provider network-side tunnel endpoint. Any of a variety of tunneling protocols (e.g., standard VPN protocols, customized protocols utilized within the VCS, etc.) may be use for transmissions of packets between the provider network and the external premises over potentially untrusted networks in various embodiments.

Because identical substrate network addresses are assigned to the ESP and to the ES, the VCS control plane may use the ESP as the destination for control plane commands (e.g., configuration commands generated in response to client-issued requests) that are actually intended for the ES in the depicted embodiment. As such, from the perspective of the VCS control plane, the ES may appear to be just another virtualization server that can be accessed via the substrate network of the VCS. When a control plane command is generated, it may be received at the ESP, and a version of the command may be sent on via the channel 366. In some embodiments, the ESP and/or the provider network-side tunnel endpoint may apply one or more security-related transformation operations on the command before sending it on to the ECM. For example, the version of the command obtained at the proxy from the VCS control plane may comprise one or more security tokens (e.g., tokens that can be used to verify the identity of the requester of the operation performed as a result of the command, and that the requester has the permissions required to request the operation) in some embodiments, and the ESP may strip or exclude the tokens from the version of the command forwarded on to the ECM at the ERG. In at least some embodiments, the original security tokens may be transformed, and a transformed version of the security tokens may be included in the forwarded version of the command. In at least one embodiment, respective message authentication codes (including for example hash-based message authentication codes or HMACs) may be generated for the outbound control plane commands sent from the ESP to the ES. In various embodiments, the ESP may log all outbound communication messages sent to a given ECM, and the logged messages may be examined by the client in whose behalf the ES is set up if desired. In some embodiments, at least two virtual network interfaces may be associated with a given ESP—one that is used to obtain commands from the VCS control plane, and one that is used to communicate with the tunnel endpoint.

In some embodiments, data plane traffic may also flow between the VCS and the external premise via secure channels or tunnels, e.g., separate from the channels used for control plane traffic. Data plane traffic may flow in either direction over such tunnels and may not involve the use of a proxy. In one embodiment, a VNI with the same substrate address as the address assigned to the ES may also be set up within the VCS for data plane traffic to/from the ES.

Figure 4:
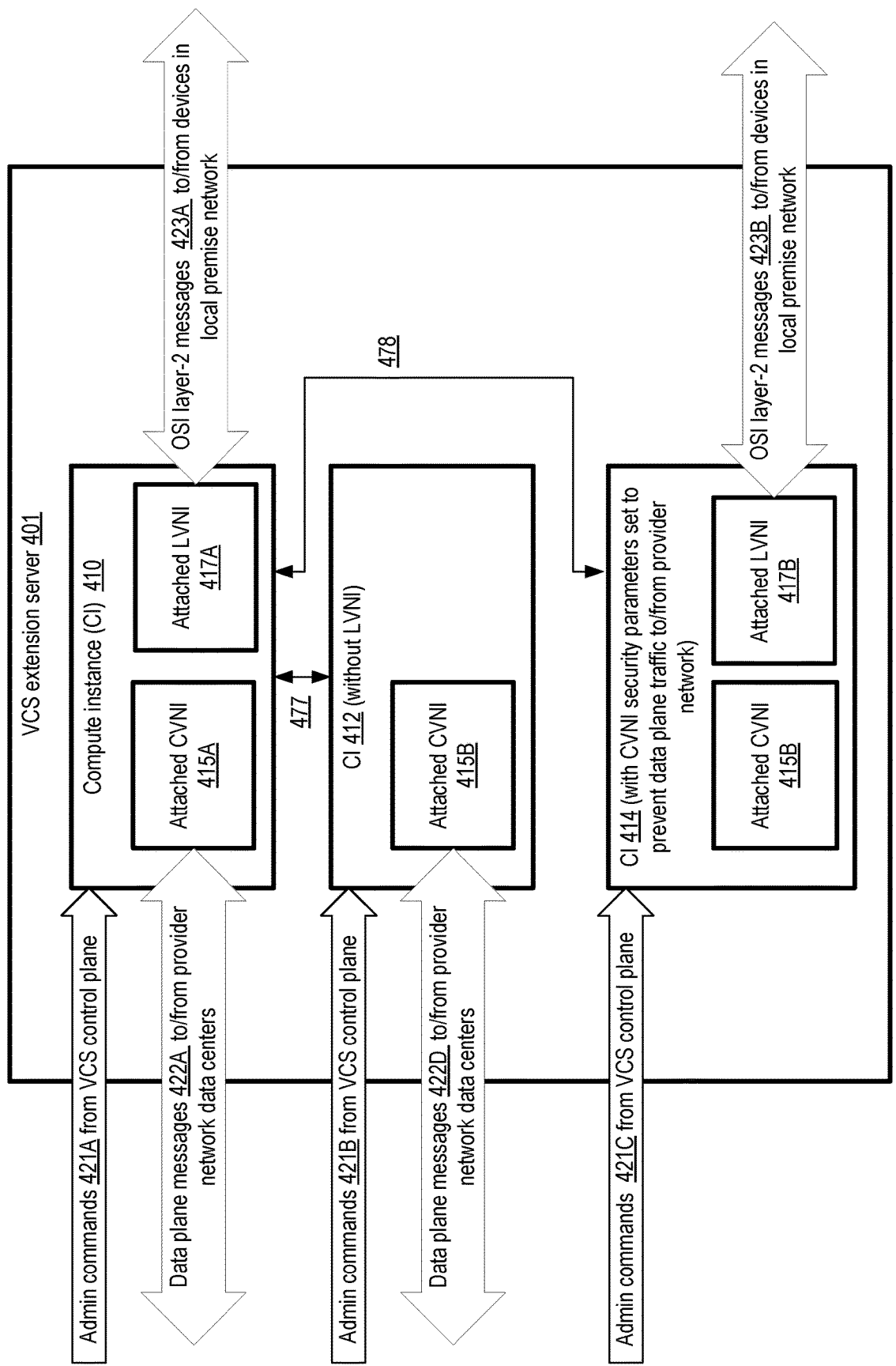
FIG. 4 illustrates example networking configurations of compute instances at an extension server, according to at least some embodiments.

FIG. 4 illustrates example networking configurations of compute instances at an extension server, according to at least some embodiments. Depending on the specific applications that a VCS client wishes to run at a given compute instance, any of at least three networking configurations may be set up for a given CI by the VCS control plane in the depicted embodiment.

CI 410 represents an example of a first networking configuration at a VCS extension server 401, in which the set of applications running at the CI communicate with resources located at the provider network data centers and also communicate with resources at other devices of the local premise network. CI 410 has an attached CVNI 415A and an attached LVNI 417A. OSI Layer 2 messages 423A to/from devices of the local premise network utilize the MAC address assigned to the LVNI 417A as the source/destination MAC address. Data plane messages 422A to/from provider network data centers utilize the IP address assigned to the attached CVNI 415A as the source/destination IP address. Administrative commands 421A from the VCS control plane (e.g., including commands to launch/terminate the CI or change various configuration settings of the CI) may also be delivered to the CI 410, e.g., using a secure channel and intermediaries such as ECMs of the kind discussed above.

In a second kind of networking configuration, represented by CI 412, a CI running at an ES may not have an LVNI attached, but may have an attached CVNI 415B. Administrative commands 421B from the VCS control plane may still be received at the CI 412, and data plane messages 422D using the CVNI's IP address may be exchanged with resources at the data centers of the provider network, but OSI layer-2 messages using a MAC address of a CVNI may not be exchanged. In some embodiments, data plane messages between a CI with the configuration of CI 412 and a CI with the configuration of CI 410 may be transferred via the provider network data centers, or via a local networking intermediary device set up at the extension premise. In at least one embodiment, as an optimization, data plane messages between a CI 412 and a CI 410 may be transmitted using a hardware loopback mechanism implemented by a networking manager of the ES, as indicated by arrow 477.

CI 414 of FIG. 4 is an example of a third type of networking configuration. CI 415B has a CVNI 415B attached and an LVNI 417B attached, but the security parameters of the CVNI 415B (and/or the IVN whose address is assigned to CVNI 415B) have been set in such a way that data plane traffic to/from the provider network data centers is prohibited. OSI Layer 2 messages 423B may be exchanged with devices of the local premise network using the MAC address assigned to LVNI 417B, and administrative commands 421C from the VCS control plane may be received at the CI 414. The type of configuration shown for CI 414 may be utilized, for example, in embodiments in which (a) a CVNI has to be attached to the CI based on the VCS configuration rules, e.g., to receive control plane commands, (b) the client wishes to use the CI for applications which require OSI L2 connectivity to non-VCS devices at the premise, and (c) the client wishes to isolate the CI from VCS data plane traffic. In one embodiment, if the client wishes to enable communication at the OSI Layer 2 between a CI 414 and a CI 410 (with both CIs having attached LVNIs), a hardware loopback mechanism implemented by the networking manager of the ES may be used, as indicated by arrow 478. Other types of networking configurations may be employed for CIs at extension servers in some embodiments than those shown in FIG. 4.

Figure 5:
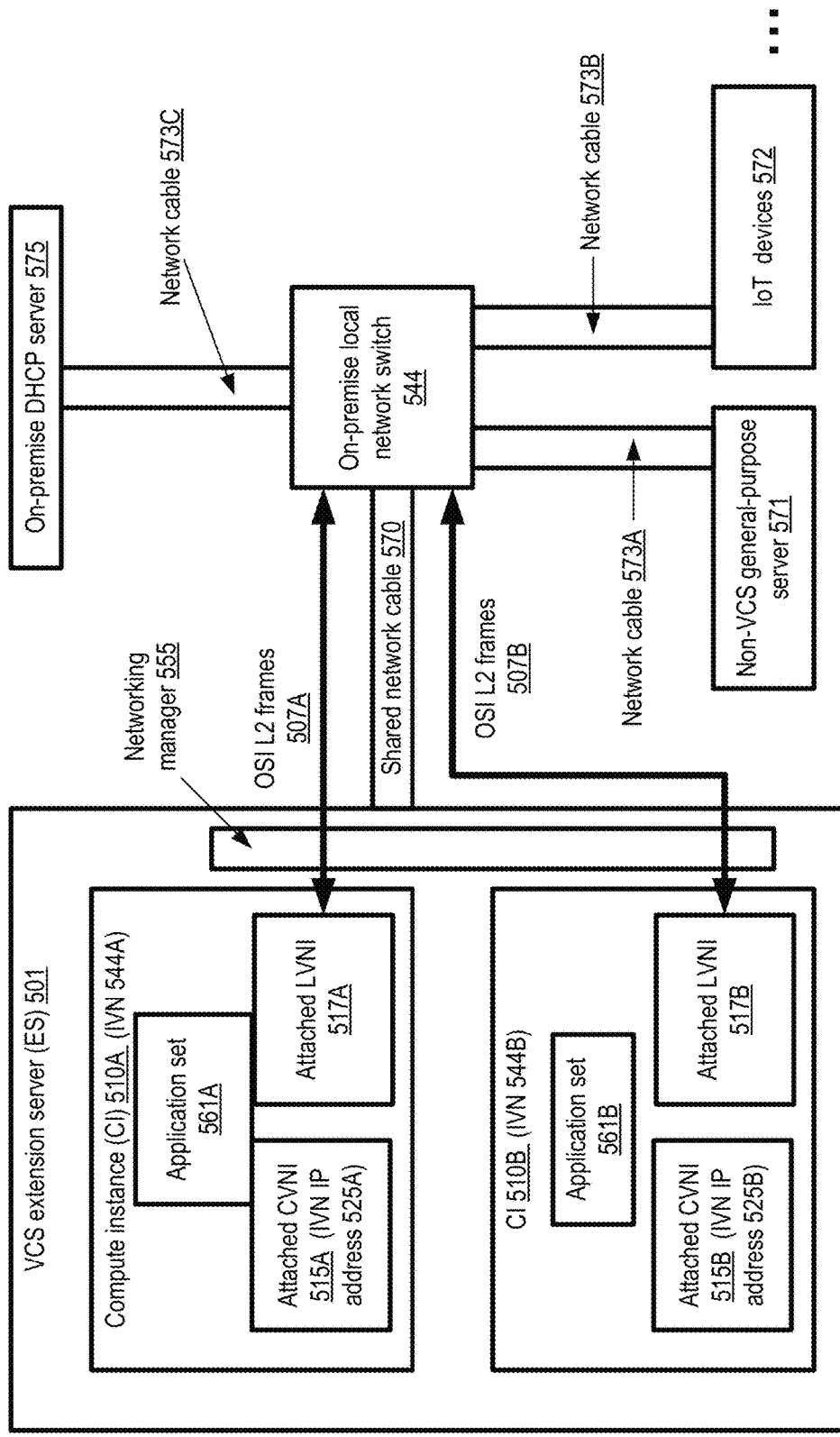
FIG. 5 illustrates an example configuration in which compute instances configured within distinct isolated virtual networks of a virtualized computing service at an extension server may share a network cable for communication with devices at a VCS extension premise, according to at least some embodiments.

In some embodiments, CIs that belong to separate IVNs may be launched at a given VCS extension server. FIG. 5 illustrates an example configuration in which compute instances configured within distinct isolated virtual networks of a virtualized computing service at an extension server may share a network cable for communication with devices at a VCS extension premise, according to at least some embodiments. VCS extension server 501 comprises CI 510A and CI 510B, as well as networking manager 555. CI 510A is used to by the VCS client to run an application set 561A, while CI 510B is used to run a different application set 561B. The VCS client on whose behalf the extension server 501 is set up may wish to isolate the two application sets, while still enabling OSI L2 communications between both application sets and (potentially distinct) sets of on-premise devices.

Accordingly, CI 510A may be configured within an IVN 544A by assigning an IP address 525A of IVN 544A to a CVNI 515A attached to CI 510A, while CI 510B may be configured within a different IVN 544B by assigning an IP address 525B of IVN 544B to a CVNI 515B attached to CI 510B in the depicted embodiment. To enable the OSI L2 connectivity, a shared network cable 570 (e.g., an Ethernet cable) may be used to link a physical network interface of the VCS extension server 501 to an on-premise local network switch 544, and a respective LVNI 517 (e.g., 517A or 517B) may be attached to the two CIs. OSI L2 frames 507A may be exchanged between the CI 510A and the local network devices via the network cable 570, and OSI L2 frames 507B may be exchanged between the CI 510B and the local network devices also using the same network cable 570, with the networking manager acting as an intermediary (logically similar to a switch) for both sets of frames.

A wide variety of non-VCS devices may be attached to the local network switch 544 in the depicted embodiment via respective network cables such as 573A, 573B and 573C, and some or all of these devices may communicate at the OSI layer 2 with one or multiple CIs run at the ES 501. Such devices may include, among others, an on-premise DHCP server 575, a non-VCS general purpose server 571, and/or one or more IoT devices 572. Note that in some embodiments, multiple network cables may be attached between the extension server and devices (such as network switches) of the local network; for example, one such cable may be used for communicating via tunneling over the public Internet with provider network data center resources and the VCS control plane, while another cable may be used for OSI layer 2 traffic with the local network.

Figure 6:
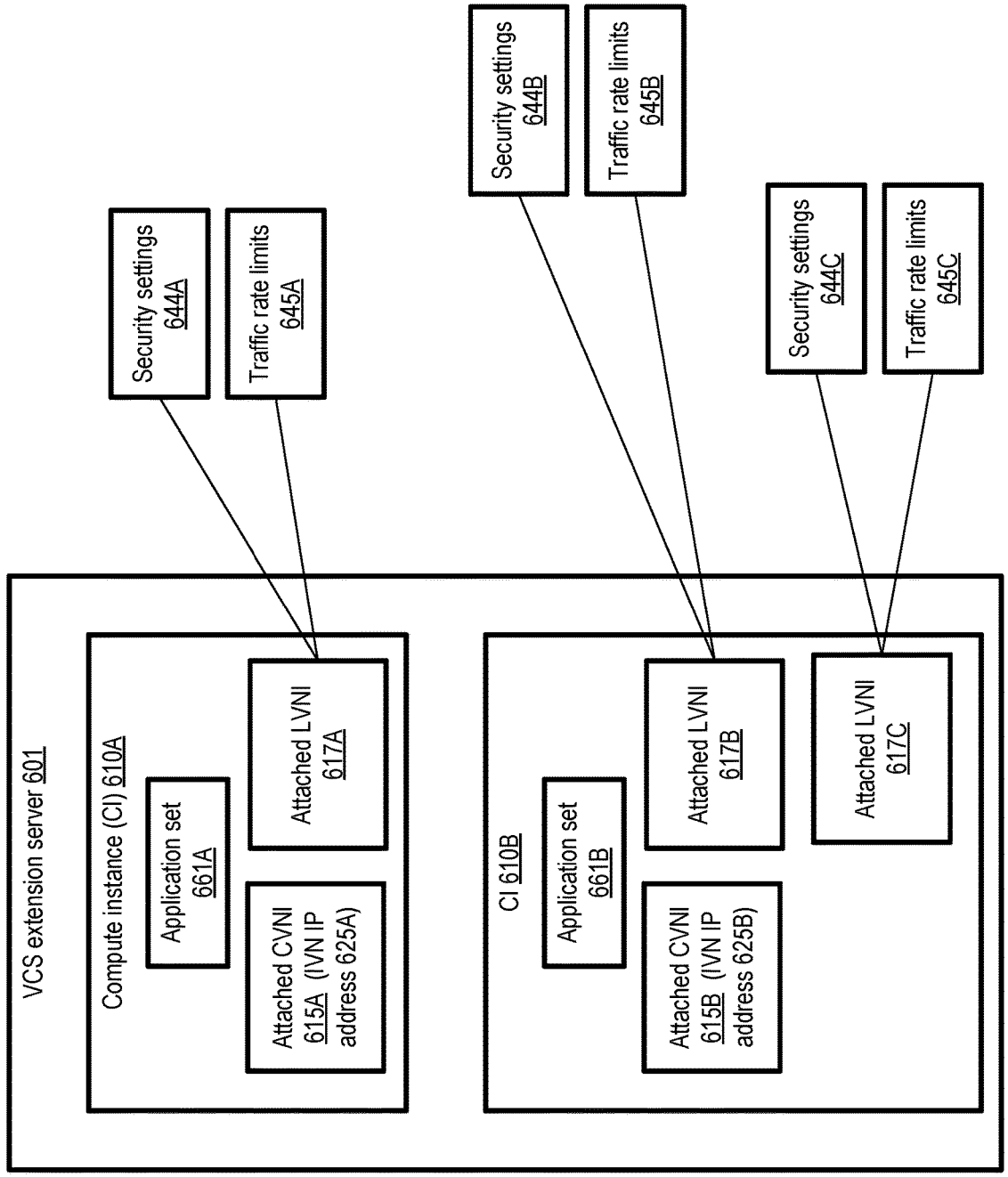
FIG. 6 illustrates an example configuration in which several local-premise-access virtual network interfaces with respective security and performance-related properties may be configured at an extension server of a virtualized computing service, according to at least some embodiments.

In some embodiments, VCS clients may decide to apply custom traffic management policies for the local-premise traffic of LVNIs attached to different compute instances at a given extension server. FIG. 6 illustrates an example configuration in which several local-premise-access virtual network interfaces with respective security and performance-related properties may be configured at an extension server of a virtualized computing service, according to at least some embodiments. A VCS extension server 601 comprises a pair of compute instances CI 610A and CI 610B in the example scenario shown in FIG. 6. CI 610A is used for application set 661A, and has an attached CVNI 615A and an attached LVNI 617A. CI 610B is used for application set 661B, has an attached CVNI 615B and two attached LVNIs 617B and 617C. An IP address 625A within an IVN of the VCS is assigned to CVNI 615A, and an IP address 625B within an IVN (which could be the same IVN, or a different IVN than the one whose address is assigned to CVNI 615A) is also assigned to CVNI 615B.

The VCS client on whose behalf the CIs 610 and the LVNIs 617 are configured may wish to apply different sets of security and performance-related rules for the respective OSI Layer 2 traffic utilizing the LVNIs' MAC addresses in the depicted embodiment. Respective security settings 644A, 644B and 644C may be specified by the client via VCS control plane programmatic interfaces for LVNIs 617A, 617B and 617C respectively. In addition, respective traffic rate limits 645A, 645B and 645C may be specified by the client via VCS control plane programmatic interfaces for the LVNIs 617A, 617B and 617C respectively. The security settings may for example specify such properties as whether broadcast frames received by the networking manager are to be sent to a compute instance to which the LVNI is attached, whether frames with specified VLAN tags or identifiers are to be delivered to a compute instance or not, and so on. The traffic rate limits may be used to throttle outbound OSI layer 2 traffic from a given CI (or from a given LVNI of a given CI) in the depicted embodiment. Recall that in some embodiments, a shared network cable (e.g., to a switch as shown in FIG. 5) may be used to connect the extension server with the remainder of the local premise network, so such rate limits may be useful in ensuring that the available bandwidth over such a cable is divided as per the objectives of the VCS client. The security settings and rate limits obtained at a VCS control plane server via programmatic interfaces from the client may be transmitted to an extension configuration manager (ECM) of the extension server and/or the networking manager of the extension server, and the settings may be applied or enforced by the networking manager in at least some embodiments. Other LVNI parameters may also or instead be customized in some embodiments by VCS clients than those shown in FIG. 6.

Figure 7:
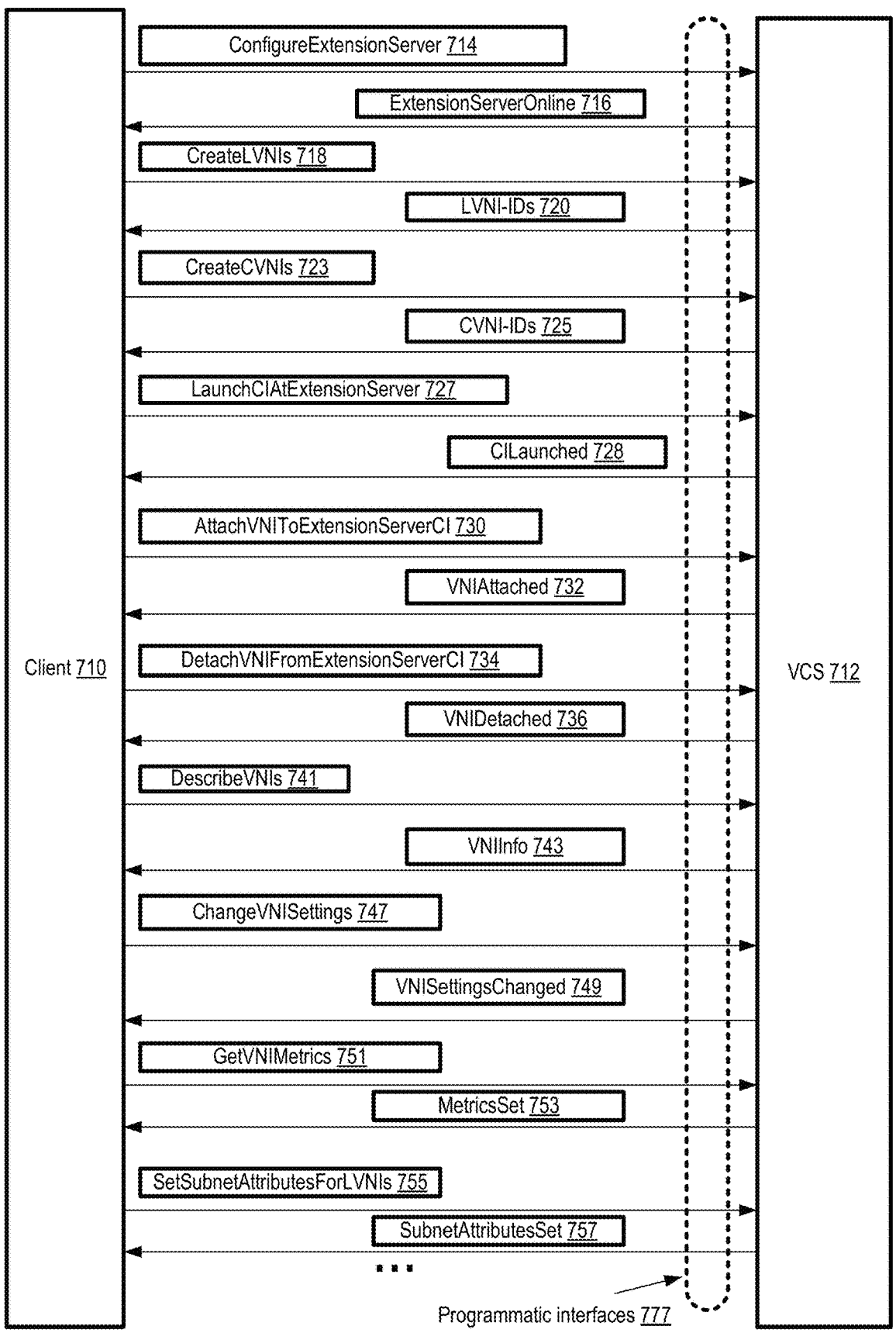
FIG. 7 illustrates example programmatic interactions related to the configuration and use of local-premise-access virtual network interfaces, according to at least some embodiments.

FIG. 7 illustrates example programmatic interactions related to the configuration and use of local-premise-access virtual network interfaces, according to at least some embodiments. A VCS 712, similar in features and functionality to VCS 110 of FIG. 1, may implement a set of programmatic interfaces 777, such as one or more web-based consoles, command-line tools, graphical user interfaces, application programming interfaces (APIs) and the like in the embodiment shown in FIG. 7. A client 710 of the VCS may submit a ConfigureExtensionServer request 714 via the programmatic interfaces to the VCS control plane, requesting the establishment of at least one extension server of the kind discussed earlier at a specified premise external to the data centers of the provider network. After the requested server has been provisioned and brought online, an ExtensionServerOnline response message 716 may be sent to the client in the depicted embodiment. Note that in some cases it may take some time (e.g., days or weeks) to ship or transmit the necessary server components to the external premise from the provider network, to then configure the server (e.g., within a standard server rack), attach the server to the Internet and power on the server, and the ExtensionServerOnline message may be sent only after all these task are completed in at least some embodiments. As discussed above, an extension server configuration manager at the external premise may establish connectivity via a secure channel with an extension connectivity manager at the VCS control plane, located at data centers of the provider network, as part of the initial configuration of the extension server in at least some embodiments.

A client 710 may request the creation of one or more LVNIs via a CreateL VNIs request 718, and the creation of one or more CVNIs via a CreateCVNIs request 723 in the depicted embodiment. Such LVNIs and/or CVNIs may be created in advance of the launch of the compute instances to which they are to be programmatically attached in some embodiments. In response, metadata indicating properties (e.g., names, descriptions, IP addresses if any are specified/ requested by the client, MAC addresses if any are specified/ requested by the client, security rules, traffic rate limits where applicable, etc.) of the requested LVNIs/CVNIs may be stored at the VCS control plane. An LVNI-IDs message 720 may be sent to the client indicating that the requested LVNIs have been created successfully in some embodiments, and providing identifiers of the created LVNIs which can be used in subsequent interactions if desired. A CVNI-IDs messages 725 may be sent to the client after the requested CVNIs have been created, indicating providing identifiers of the created LVNIs which can be used in subsequent interactions if desired.

A compute instance may be launched at an extension server in response to a LaunchCIAtExtensionServer request 727 in the depicted embodiment. Parameters of the launch request may govern the manner in which VNIs (e.g., one or more CVNIs and/or LVNIs) are to be programmatically attached to the CI. In some cases, a client may request that the VCS control plane create and attach at least one CVNI within a specified IVN at the time of the instance launch, and/or that the VCS create and attach at least one LVNI with a VCS-selected MAC address at the time of the instance launch. In other cases, the client may defer the attachment of one or more VNIs until after the instance has been launched and a CILaunched message 728 has been received at the client.

Clients may request the programmatic attachment of one or more VNIs (e.g., either LVNIs, or CVNIs, or both) to a CI at an extension server by submitting Attach VNIToExtensionServerCI requests 730 to the VCS in the depicted embodiment. If desired, the client may specify an identifier of the VNI to be attached (e.g., a CVNI or an LVNI) or request that the VCS control plane create and attach a new VNI. After metadata indicating the association of the VNI with the CI has been stored at the VCS control plane and propagated to the extension server, a VNIAttached message 732 may be sent to the client in the depicted embodiment.

An LVNI or a CVNI may be programmatically detached from a CI by the VCS control plane in response to a DetachVNIFromExtensionServerCI request 734 in the depicted embodiment. Such a detachment may comprise deleting the indication of the association of the VNI with the CI to which it as attached, while retaining at least some of the other properties of the VNI such as its MAC address and/or IP address. A VNIDetached message 736 may be sent to the client to indicate that the VNI has been disassociated from the CI.

A DescribeVNIs request 741 may be submitted by a client 710 to view the properties of a specified set of VNIs (e.g., LVNIs, CVNs or both types of VNIs) and/or all the VNIs attached to a CI in the depicted embodiment. The properties of the VNI(s) may be presented to the client via one or more VNIInfo messages 743. For example, a client may use a DescribeVNIs request to obtain the MAC address of an LVNI (prior to the attachment of the LVNI to a CI, or after the attachment) and use that information to make configuration changes within the on-premise network from which OSI L2 traffic is going to be exchanged with the CI to which that LVNI is attached.

As discussed above, e.g., in the context of FIG. 6, a client may wish to customize various properties such as security settings or traffic rate limits of LVNIs (and/or CVNIs). A ChangeVNISettings request 747 indicating the desired settings may be submitted by the client using programmatic interfaces 777 in some embodiments. The metadata stored for the VNI may be modified accordingly, and a VNISettingsChanged response message 749 may be sent to the client.

The VCS may collect various types of metrics pertaining to specific CVNIs and LVNIs in different embodiments, such as the rates at which messages are received/sent using the addresses assigned to the VNIs, the distributions of the sizes of the messages, the trends in traffic rates, and so on. A client may request metrics for LVNIs and/or CVNIs, e.g., on a per-VNI-type basis or on a per-VNI basis, by submitting a GetVNIMetrics request 751 in the depicted embodiment. Requested metrics may be provided in one or more MetricsSet response messages 753.

In some embodiments, an LVNI may be treated (by the VCS control plane) as a special case of a more generic VNI construct supported at the VCS. In such an embodiment, if a client 710 requests a creation or attachment of a VNI without specifying that the VNI is to be used as an LVNI, the VCS may be default assume that the VNI is to be used as a CVNI (e.g., the VNI is to be assigned an IVN address, etc.). In an embodiment in which such a generic VNI construct is supported, a VCS client 710 may utilize configuration settings of an IVN subnet to indicate that LVNIs are to be configured for CIs whose IP addresses (i.e., CVNI IP addresses) lie within that subnet's IP address range. The VCS client may submit a SetSubnetAttributesForL VNIs request 755, indicating that for a compute instance configured within a specified subnet of a specified IVN, any VNI at a specified integer interface index within an array or list of VNIs attached to that CI is to be utilized or treated as an LVNI. In response, the VCS may store the LVNI index as an attribute of the subnet, and treat VNIs subsequently attached at that index (e.g., in response to attachment requests which specify the index) as LVNIs. A SubnetAttributesSet message 757 may be sent to the client from the VCS. The subnet attribute method for configuring LVNIs may simplify the management of LVNIs for VCS clients, as the client may simply use the same types of programmatic requests for LVNIs as are used for other VNIs (as long as the correct interface index is used for the LVNIs) without using parameters specific to LVNIs. It is noted that programmatic interactions pertaining to the use of LVNIs, CVNIs and extension servers, other than those shown in FIG. 7, may be supported by a VCS in at least some embodiments. Furthermore, FIG. 7 is not intended to illustrate a required sequence in which programmatic interactions have to occur; for example, while the DescribeVNIs request is shown at a lower position in FIG. 7 than the LaunchCIAtExtensionServer request, a DescribeVNIs request may be submitted before a LaunchCIAtExtensionServer request.

Figure 8:
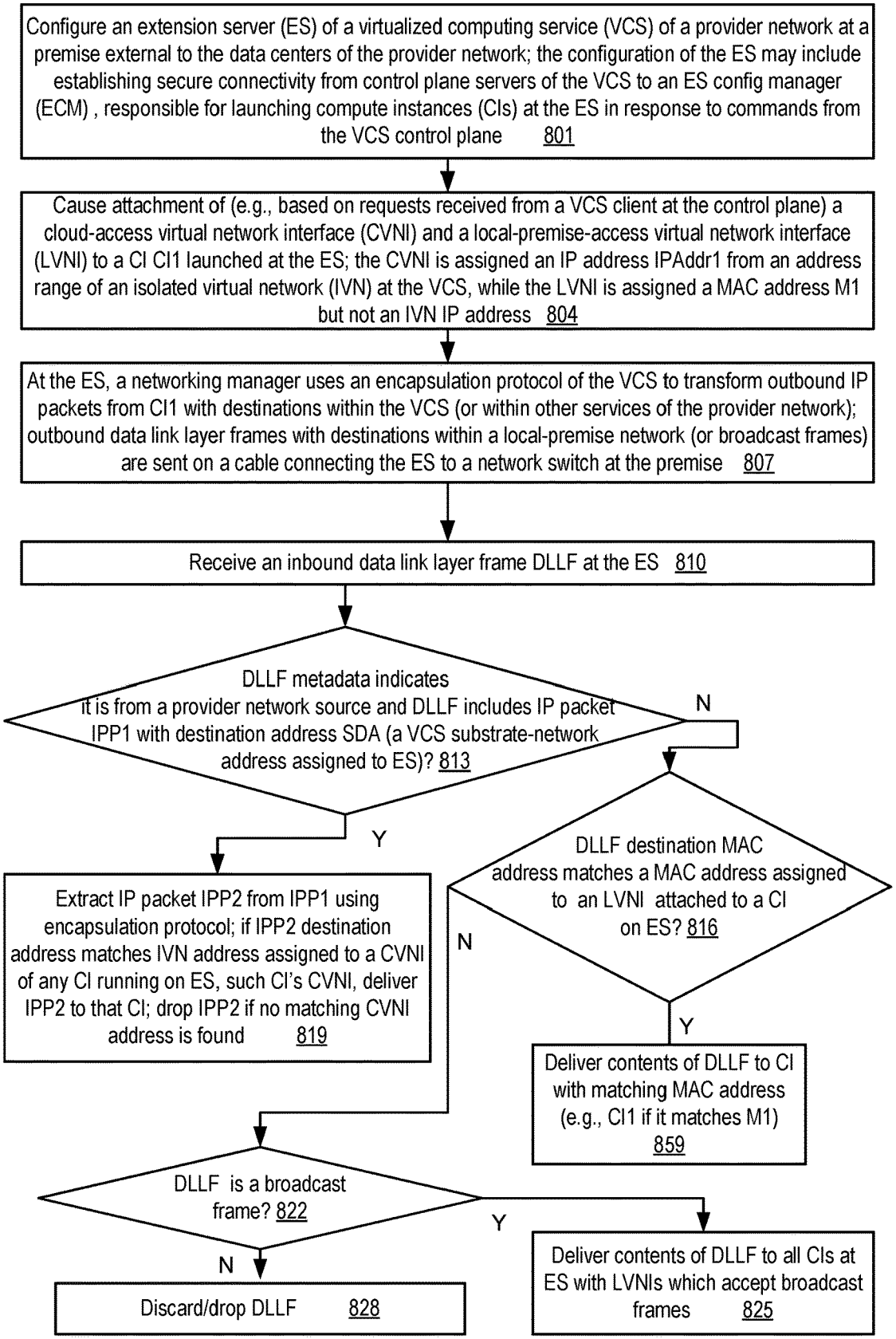
FIG. 8 is a flow diagram illustrating aspects of operations which may be performed to configure and utilize local-premise-access virtual network interfaces, according to at least some embodiments.

FIG. 8 is a flow diagram illustrating aspects of operations which may be performed to configure and utilize local-premise-access virtual network interfaces, according to at least some embodiments. As shown in element 801, an extension server (ES) of a VCS, similar in features and functionality to VCS 110 of provider network 101 of FIG. 1, may be configured at a premise external to the data centers of the provider network in the depicted embodiment. The configuration of the ES may comprise establishing connectivity via secure channels from control plane servers (CPSs) of the VCS to an ES configuration manager (ECM) running at the ES. The ECM may be responsible for, among other tasks, launching compute instances (CIs) at the ES in response to requests/commands from the VCS control plane in various embodiments. The ES may also include a networking manager in various embodiments, responsible for managing the flow of network traffic between CIs launched at the ES and communication endpoints external to the ES, and also the flow of network traffic among the CIs of the ES.

In response to a request from a VCS client for whom the ES is set up, the VCS control plane may cause a CI, CI1, to be launched at the ES. A local-premise-access virtual network interface (LVNI) may be caused to be programmatically attached to CI1 by the VCS control plane, and a cloud-access virtual network interface (CVNI) may also be programmatically attached to the CI in the depicted embodiment (element 804). In at least some embodiments, a control plane server of the VCS may receive a request to attach the LVNI or the CVNI to the CI via a programmatic interface from a client, and the control plane server in turn may transmit an internal request/command to a configuration management component or a networking manager at the ES, which causes the attachment operation to be completed. The CVNI may be assigned an IP address IPAddr1 from an address range of an isolated virtual network (IVN) configured at the VCS. The LVNI may be assigned a MAC address M1 by the VCS control plane, but not an IP address from within that IVN or from within any range of IP addresses managed by the VCS. The networking manager may be provided the configuration information (e.g., including IP and MAC addresses) pertaining to the attached CVNI and the attached LVNI from the VCS control plane in at least some embodiments.

At the ES, the networking manager may utilize an encapsulation protocol of the VCS to transform outbound IP packets from CI1 with destination addresses within the VCS (or within other services of the provider network) (element 807). Outbound data link layer frames with destination MAC addresses within a local network of the premise (or with destination addresses used for broadcasts) may be directed by the networking manager to a network switch or other similar networking intermediary device at the premise via a cable connecting the ES to the intermediary device.

An inbound data link layer frame DLLF may be obtained at a physical networking interface (e.g., a network interface card or the equivalent thereof) of the ES (element 810) and processed by the networking manager. In some implementations DLLF may have associated metadata (e.g., an indication of a source queue into which it is placed by low-level driver software or by hardware networking components) which indicates whether the source from which the DLLF was received was a provider network resource, or whether it was received from a local device of the premise at which the ES is located. In such implementations, such metadata may first be checked by the networking manager to determine the kind of source from which DLLF was sent, and the information about the source may then be used along with contents of DLLF to determine how DLLF should be processed; for example, the VCS's encapsulation protocol may only be used as described below if DLLF is received from a provider network resource. If DLLF includes an IP packet IPP1 with a destination address SDA which is a VCS substrate network address that was assigned to the ES earlier (e.g., during initial configuration of the ES), as determined in operations corresponding to element 813, the networking manager may extract, using the VCS's encapsulation protocol, a second IP packet IPP2 which was encapsulated within IPP1 (element 819). If the destination IP address of IPP2 matches the IP address assigned to a CVNI of any CI running at the ES, such as the IP address IPAddr1 assigned to CI1's CVNI, the networking manager may deliver the contents of the second IP packet IPP2 to that CI. In the unlikely event that there is no IP address match with a CVNI of a CI at the ES, IPP2 may be dropped in the depicted embodiment. In some implementations metadata of the kind described above may not be used.

In at least some embodiments, if the DLLF does not include an IP packet with SDA as the destination address, the networking manager may try to use the destination MAC address of DLLF to identify one or more CIs to which DLLF contents should be delivered. If the DLLF destination MAC address matches a MAC address assigned to any CI running on ES (such as MAC address M1 assigned to CI1's LVNI) (as determined in operations corresponding to element 816), the networking manager may deliver at least a subset of DLLF contents to that CI in the depicted embodiment (element 859).

If an exact match with a MAC address of an LVNI is not found, the networking manager may determine whether DLLF is a broadcast frame (element 822). If DLLF is a broadcast frame, its contents may be delivered to all CIs running at ES with LVNIs which are configured to accept broadcast frames (e.g., based on the LVNI's security settings or other parameters) in the depicted embodiment (element 825). Otherwise, if DLLF may be dropped in various embodiments (element 828), as the networking manager was unable to find a suitable destination CI for it using CVNI IVN IP address matching or LVNI MAC address matching, and DLLF was not a broadcast frame. Operations corresponding to elements 810 onwards may be repeated for at least some inbound data link layer frames by the network manager in the depicted embodiment.

It is noted that in various embodiments, some of the operations shown in the flow diagram of FIG. 8 may be implemented in a different order than that shown in the figure, or may be performed in parallel rather than sequentially. For example, in some embodiments, the MAC address based checking (elements 816 and 859) may be performed prior to the IP address based checking (elements 813 and 819) to identify a destination CI for an inbound message. Additionally, some of the operations shown in FIG. 8 may not be required in one or more implementations.

Figure 9:
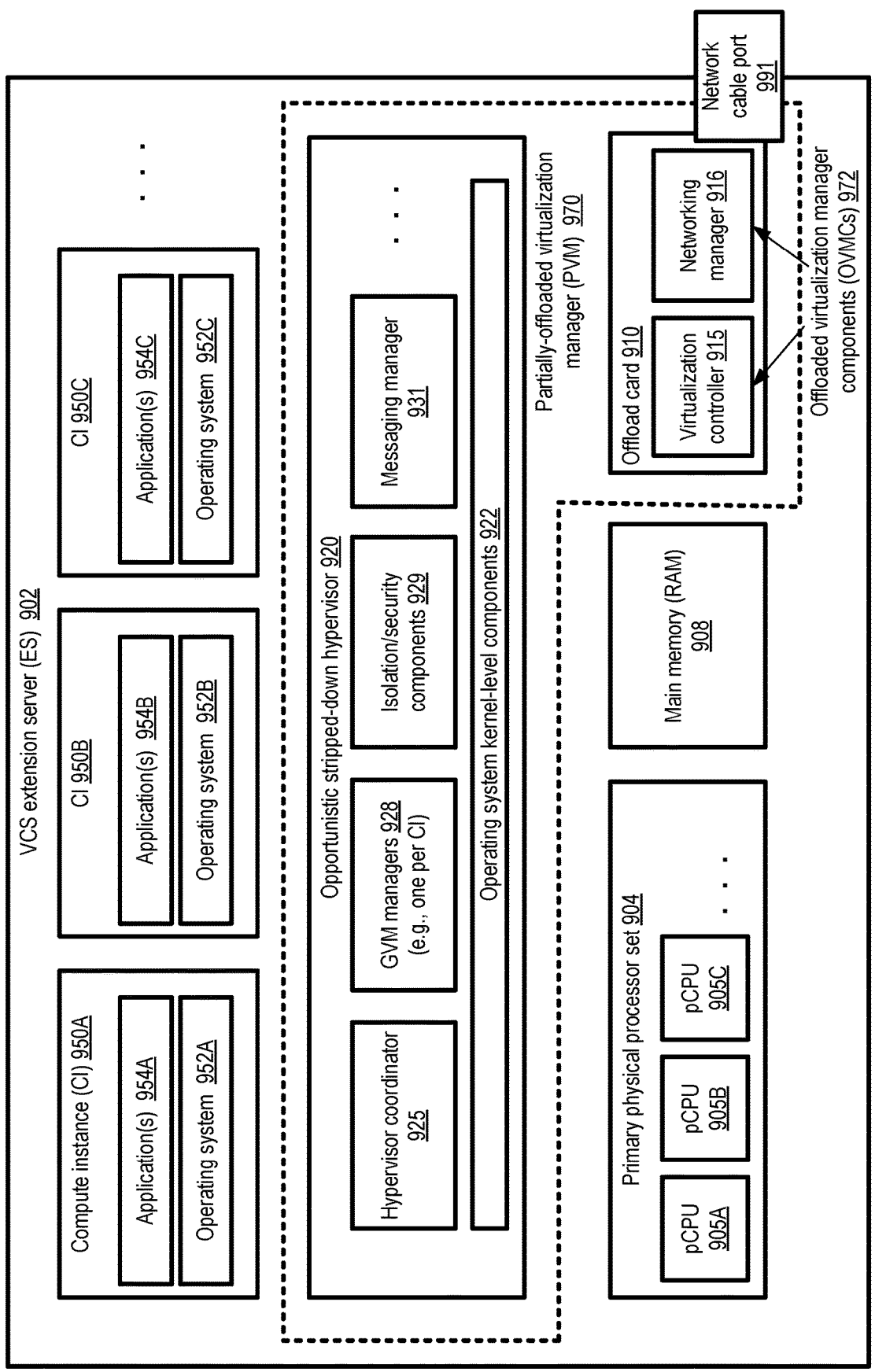
FIG. 9 illustrates example components of an extension server, according to at least some embodiments.

In some embodiments, a networking manager which is responsible for directing incoming messages to compute instances at an extension server may be implemented at least in part at an offloading card of the extension server. FIG. 9 illustrates example components of an extension server, according to at least some embodiments. As shown, a VCS extension server (ES) 902 may comprise a primary physical processor set 904, a main memory (e.g., one or more modules of random access memory or RAM) 908, a partially-offloaded virtualization manager (PVM) 970, and CIs 950 such as CI 950A, 950B, and 950C to which LVNIs and/or CVNIs of the kind discussed above may be programmatically attached. Individual ones of the CIs 950 may comprise a respective virtual machine referred to as a guest virtual machine (GVM) in some embodiments. ES 902 may also comprise a number of other components, e.g., various persistent storage devices, which are not shown in FIG. 9 to avoid clutter. The primary physical processor set 904 may comprise a number of physical CPUs (pCPUs), including pCPUs 905A—905C in the depicted embodiment. Virtualized versions of the pCPUs, called vCPUs or virtual CPUs, may be allocated to individual CIs by the PVM 970 during the lifetime of the CIs. Each CI 950 may comprise a respective instance of an operation system (e.g., operating systems 952A-952B) and a set of applications (e.g., 954A-954C) being run on behalf of clients of the virtualized computing service. One or more of the applications 954 and/or the associated operating systems 952 may exchange data link layer messages with devices within local premise networks using LVNIs as described above.

The PVM 970 may comprise an opportunistic stripped-down hypervisor 920 (which runs on the pCPUs) and one or more offloaded virtualization manager components (OVMCs) 972 which do not use the pCPUs in the depicted embodiment. OVMCs 972 may include, for example, a virtualization controller 915 and at least a portion of a networking manager 916 at offload card 910. The networking manager may examine data link layer frames received at the ES via a cable connected to a network cable port 991 of the offload card 910, and determine to which CI the contents of that frame are to be delivered using the methodology described earlier (e.g., whether an IVN address of a CVNI is to be used to select the destination CI, or a MAC address of an LVNI is to be used). The other end of the cable may be connected to a local network switch as discussed in the context of FIG. 4. Individual ones of the OVMCs may be implemented using a respective system-on-chip design in some embodiments. Although both OVMCs 972 are shown as being incorporated within a single offload card 910 (e.g., a Peripheral Component Interconnect-Express or PCIe card) in the depicted embodiment, other approaches regarding the arrangement and organization of the OVMCs may be employed in different embodiments. For example, in one embodiment, a single system-on-chip implementation may be used to perform the functions of the virtualization controller and the networking manager, thereby eliminating the need for two different OVMCs. In another embodiment, respective offload cards may be used for the virtualization controller 915 and the networking manager 916. The virtualization controller, as suggested by its name, may be responsible for organizing or orchestrating much of the virtualization management work performed at the ES 902 in the depicted embodiment—e.g., it may be the first of the components of the PVM to boot, trigger the launches of the other components of the PVM, communicate with the VCS control plane, make memory allocation decisions with respect to CIs, and so on. The networking manager 916 may be responsible for implementing one or more networking protocols (including for example the encapsulation protocol used within the VCS) and acting as an intermediary between the CIs and networking endpoints outside the ES in the depicted embodiment.

Hypervisor 920 may be described as being stripped-down in the depicted embodiment because much of the work performed by at least some conventional hypervisors may be handled by the OVMCs 972 instead, thereby reducing the complexity and size of the hypervisor 920. In addition, hypervisor 920 may be designated as opportunistic because, under most circumstances, it may wait until a CI voluntarily relinquishes control of a pCPU 905 before the hypervisor uses CPU cycles. Thus, for example, when a particular CI 950 issues an I/O request (where the I/O is expected to take approximately time T1 to complete) and gives up a pCPU until a response to the I/O request is received, the hypervisor may make use of this opportunity to use the pCPU to perform one or more virtualization management tasks (which may typically take time T2, where T2<<T1) while the CI is not expecting to use the pCPU. As such, the hypervisor 920 may have a minimal impact on the performance of applications 954 in the depicted embodiment.

The hypervisor 920 may itself comprise a number of subcomponents in the depicted embodiment, including a set of operating system kernel-level components 922, a hypervisor coordinator 925, one or more GVM managers 928, isolation/security components 929, and/or a messaging manager 931. The hypervisor coordinator 925, individual ones of the GVM managers 928, the isolation/security components 929 and/or the messaging manager 931 may be implemented as respective user-mode processes in at least some embodiments. In various embodiments, at least some of these components may be implemented as instances of respective statically linked programs, communicating with one another via pipes using simple, specialized protocols. The subcomponents of the hypervisor may remain passive or quiesced by default in the depicted embodiment, reacting and activating only in response to events (such as messages from other subcomponents, context switches initiated by CIs, etc.). In some implementations, for example, several of the hypervisor subcomponents may typically remain blocked on a polling system call (such as epoll( ) or the equivalent) most of the time.

The kernel-level components 922 may provide support for various low-level operations such as the initial responses to VM exit instructions issued by the CIs (e.g., when a CI gives up a pCPU). The hypervisor coordinator 925, as implied by the name, may be responsible for orchestrating operations of the other subcomponents. The hypervisor coordinator 925 may, for example, implement an API which can be used for communications between the OVMCs 972 and the hypervisor, initiating CI launches and terminations (e.g., at the request of an OVMC which has received a request from the VCS control plane for launching or terminating a CI), exposing metrics collected by the GVM managers, providing debugging capabilities, and so on.

Each GVM manager 928 may be responsible for launching or instantiating a respective CI based on a specification provided by the coordinator 925, monitoring metrics and logs of the GVM, and so on. In some embodiments a GVM manager 928 may also help with CI-requested I/O operations for certain devices, e.g., by trapping CI I/O requests and translating them to memory-mapped I/O operations completed with the help of an OVMC. In at least some embodiments, in accordance with the security-related principle of least privilege, a GVM manager 928 may drop many of its own privileges as soon as possible during the instantiation of a CI. For example, after one or more vPCU (virtual CPU) threads have been spawned for a CI, and the CI's memory has been mapped, the GVM manager may disable some of its privileges to reduce the opportunity for security breaches. In some embodiments there may be a 1-to-1 mapping between GVM managers and CIs, while in other embodiments a single GVM manager may be responsible for multiple GVMs.

The messaging manager 931 may act as an intermediary between the virtualization controller 915 and the hypervisor, e.g., by translating commands issued using a queue-based protocol by the virtualization controller into pipe messages within the hypervisor. The security and isolation components 929 may be responsible, for example, for scrubbing or cleaning up CI memory when a CI terminates, so that inadvertent sharing of data across CIs can be avoided. In some embodiments, at least a portion of the networking manager functionality may be implemented at the hypervisor. It is noted that the PVM may comprise additional components (not shown in FIG. 9) in at least some embodiments, while in at least one embodiment one or more of the PVM components shown in FIG. 9 may not be required.

Figure 10:
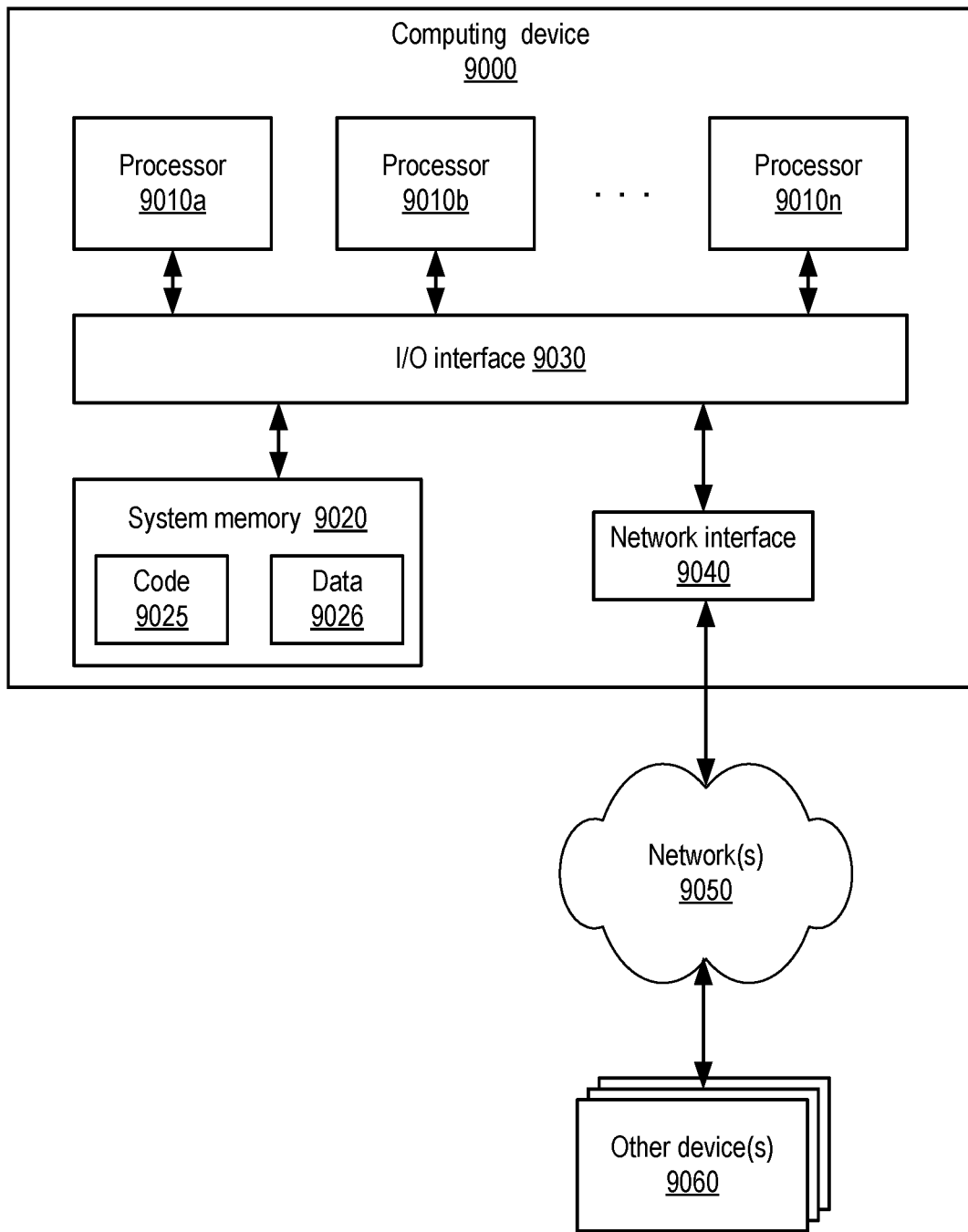
FIG. 10 is a block diagram illustrating an example computing device that may be used in at least some embodiments.

In at least some embodiments, a server that implements the types of techniques described herein (e.g., including VCS control plane functions and/or external server functions), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators and/or offloaders of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electro-magnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a control plane server of a virtualized computing service of a provider network, wherein the control plane server is located at a data center of the provider network; and
a networking manager of an extension server of the virtualized computing service, wherein the extension server is located at a premise external to the provider network;
wherein the control plane server is configured to:
cause attachment of a cloud-access virtual network interface to a compute instance of the virtualized computing service, wherein the compute instance runs at the extension server, and wherein the cloud-access virtual network interface is assigned a first Internet Protocol (IP) address from a range of IP addresses of an isolated virtual network configured at the virtualized computing service; and
cause attachment of a local-premise-access virtual network interface to the compute instance, wherein the local-premise-access virtual network interface is assigned a particular media access control (MAC) address by the control plane server, and wherein the local-premise-access virtual network interface is not assigned an IP address from the range of network addresses of the isolated virtual network; and
wherein the networking manager is configured to:
in response to determining at least that a first data link layer frame received at the extension server comprises a first IP packet with a destination address within a set of virtualization host network addresses of a substrate network of the virtualized computing service,
utilize an encapsulation protocol of the virtualized computing service to extract a second IP packet from the first IP packet; and
in response to determining that the destination address of the second IP packet matches the first IP address, deliver the second IP packet to the compute instance; and
in response to determining that a destination MAC address of a second data link layer frame received at the extension server matches the particular MAC address, wherein the second data link layer frame does not comprise an IP packet with the destination address of the first IP packet, deliver, without utilizing the encapsulation protocol, at least a portion of contents of the second data link layer frame to the compute instance.

2. The system as recited in claim 1, wherein the control plane server is further configured to:
obtain, via a programmatic interface, a request to launch the compute instance, wherein the local-premise-access virtual network interface is created and programmatically attached to the compute instance in response to the request to launch the compute instance.

3. The system as recited in claim 1, wherein the control plane server is further configured to:
in response to receiving, via a programmatic interface, a request to terminate the compute instance, store an indication that the particular MAC address is available for re-use;
assign the particular MAC address to another local-premise-access virtual network interface; and
programmatically attach the other local-premise-access virtual network interface to another compute instance.

4. The system as recited in claim 1, wherein the control plane server is further configured to:
determine at least a portion of the particular MAC address based on input received via a programmatic interface from a client of the virtualized computing service on whose behalf the compute instance is launched.

5. The system as recited in claim 1, wherein the control plane server is further configured to:
cause to be provided, via a programmatic interface, (a) a first set of metrics pertaining to network traffic associated with the cloud-access virtual network interface and (b) a second set of metrics pertaining to network traffic associated with the local-premise-access virtual network interface.

6. A computer-implemented method, comprising:
causing, by a control plane server of a virtualized computing service, attachment of a first local-premise-access virtual network interface to a first compute instance of the virtualized computing service, wherein the control plane server is located at a data center of a provider network, wherein the first compute instance runs at a particular server located at a premise external to the data center, and wherein the first local-premise-access virtual network interface is assigned a first media access control (MAC) address by the control plane server;
in response to determining, by a networking manager of the particular server, that a first data link layer frame received at the particular server comprises a first IP packet with a particular destination address assigned to the particular server,
extracting, using an encapsulation protocol of the virtualized computing service, a second IP packet from the first IP packet; and
delivering the second IP packet to the first compute instance; and in response to determining, by the networking manager, that a destination MAC address of a second data link layer frame received at the particular server matches the first MAC address, delivering at least a portion of contents of the second data link layer frame to the first compute instance.

7. The computer-implemented method as recited in claim 6, further comprising:
in response to a programmatic request, creating the first local-premise-access virtual network interface by the control plane server prior to a launch of the first compute instance at the particular server.

8. The computer-implemented method as recited in claim 6, wherein the second data link layer frame is received at the particular server via a cable connected to a network switch of a local network of the premise.

9. The computer-implemented method as recited in claim 6, further comprising:
in response to one or more requests received via a programmatic interface, causing detachment of the first local-premise-access virtual network interface from the first compute instance and causing attachment of the first local-premise-access virtual network interface to a second compute instance; and
in response to determining, after the first local-premise-access virtual network interface has been programmatically attached to the second compute instance, that a destination MAC address of a third data link layer frame received at a server at which the second compute instance runs matches the first MAC address, delivering at least a portion of contents of the third data link layer frame to the second compute instance.

10. The computer-implemented method as recited in claim 9, wherein the first compute instance is configured within a first isolated virtual network of the virtualized computing service, and wherein the second compute instance is configured within a second isolated network of the virtualized computing service.

11. The computer-implemented method as recited in claim 6, further comprising:
causing attachment, by the control plane server, of a second local-premise-access virtual network interface to a second compute instance launched at the particular server of the virtualized computing service, wherein the second local-premise-access virtual network interface is assigned a second MAC address, and wherein the second local-premise-access virtual network interface is not assigned an Internet Protocol (IP) address by the control plane server; and
in response to determining, by the networking manager, that a destination MAC address of a third data link layer frame received at the particular server matches the second MAC address, delivering at least a portion of contents of the third data link layer frame to the second compute instance.

12. The computer-implemented method as recited in claim 6, further comprising:
in response to a request received via a programmatic interface, providing the first MAC address.

13. The computer-implemented method as recited in claim 6, further comprising:
causing attachment, by the control plane server, of a second local-premise-access virtual network interface to the first compute instance, wherein the second local-premise-access virtual network interface is assigned a second MAC address, and wherein the second local-premise-access virtual network interface is not assigned an Internet Protocol (IP) address by the control plane server; and
in response to determining, by the networking manager, that a third data link layer frame with the second MAC address as a destination has been received at the particular server, delivering at least a portion of contents of the third data link layer frame to the first compute instance.

14. The computer-implemented method as recited in claim 6, wherein the second data link layer frame is received at the particular server from one of: (a) an Internet-of-things (IoT) device at the premise or (b) an industrial automation device at the premise.

15. The computer-implemented method as recited in claim 6, further comprising:
obtaining, at the control plane server via a programmatic interface, an indication of a security setting to be applied with respect to network traffic associated with the first local-premise-access virtual network interface, wherein the security setting includes a restriction on sources from which data link layer frames are to be accepted; and
enforcing, by the networking manager, the security setting, wherein enforcing the security setting comprises verifying, prior to delivering the portion of contents of the second data link layer frame to the first compute instance, that a source from which the second data link layer frame is received does not violate the restriction.

16. A non-transitory computer-accessible storage medium storing program instructions that when executed on a processor:
detect, by a networking manager at an extension server of a virtualized computing service, that a first data link layer frame has been obtained at the extension server; and
deliver, by the networking manager, to a first compute instance running on the extension server, at least a portion of contents of the first data link layer frame in response to determining that a destination media access control (MAC) address of the first data link layer frame matches a particular MAC address of a first local-premise-access virtual network interface attached to the first compute instance, wherein the first local-premise-access virtual network interface is not assigned an Internet Protocol (IP) address from a range of IP addresses managed by the virtualized computing service.

17. The non-transitory computer-accessible storage medium as recited in claim 16, storing further program instructions that when executed on the processor:
throttle a rate at which data link layer frames are transmitted from the first compute instance, based at least in part on a rate limit indicated via a programmatic interface.

18. The non-transitory computer-accessible storage medium as recited in claim 16, storing further program instructions that when executed on the processor:
in response to detecting that a broadcast data link layer frame has been received at the extension server, deliver, by the networking manager, at least a portion of contents of the broadcast data link layer frame to a plurality of compute instances of the extension server, including the first compute instance and a second compute instance to which a second local-premise-access virtual network interface is programmatically attached.

19. The non-transitory computer-accessible storage medium as recited in claim 16, storing further program instructions that when executed on the processor:
  subsequent to a detachment of the first local-premise-access virtual network interface from the first compute instance, determine, by the networking manager than contents of a second data link layer frame received at the extension server are not to be delivered to the first compute instance, wherein a destination MAC address of the second data link layer frame matches the particular MAC address.

20. The non-transitory computer-accessible storage medium as recited in claim 16, wherein the first data link layer frame comprises a message formatted in accordance with one of: the Address Resolution Protocol (ARP), the Domain Host Configuration Protocol (DHCP), or a custom data link layer application implemented within a local network at a premise at which the extension server is located.

\* \* \* \* \*